(12) United States Patent
Flavin et al.

(10) Patent No.: US 7,539,196 B2
(45) Date of Patent: May 26, 2009

(54) METHOD AND APPARATUS FOR TUNNELLING DATA IN A NETWORK

(75) Inventors: Anthony J Flavin, Ipswich (GB); Alan McGuire, Felixstowe (GB)

(73) Assignee: British Telecommunications plc, London (GB)

( * ) Notice: Subject to any disclaimer, the term of this patent is extended or adjusted under 35 U.S.C. 154(b) by 780 days.

(21) Appl. No.: 10/466,283

(22) PCT Filed: Jan. 28, 2002

(86) PCT No.: PCT/GB02/00361

§ 371 (c)(1),
(2), (4) Date: Jul. 15, 2003

(87) PCT Pub. No.: WO02/063834

PCT Pub. Date: Aug. 15, 2002

(65) Prior Publication Data

US 2004/0062277 A1  Apr. 1, 2004

(30) Foreign Application Priority Data

Feb. 2, 2001  (GB) ................................. 1300935.2

(51) Int. Cl.
*H04L 12/56* (2006.01)
(52) U.S. Cl. ..................... 370/394; 370/466; 370/474
(58) Field of Classification Search .............. 370/230, 370/235, 236, 310.1, 310.2, 338, 351, 352, 370/360, 386, 389, 392, 395.1, 401, 465–466, 370/474, 503, 394; 398/43, 49, 51
See application file for complete search history.

(56) References Cited

U.S. PATENT DOCUMENTS

| 5,627,836 | A | * | 5/1997 | Conoscenti et al. | ......... 370/397 |
| 5,682,257 | A | * | 10/1997 | Uchida | ........................ 398/43 |
| 6,169,754 | B1 | * | 1/2001 | Sugawara et al. | ........... 370/498 |
| 6,345,051 | B1 | * | 2/2002 | Gupta et al. | ............. 370/395.2 |
| 7,177,308 | B2 | * | 2/2007 | Ofek et al. | .................. 370/389 |
| 2002/0001308 | A1 | | 1/2002 | Heuer | |
| 2005/0175004 | A1 | * | 8/2005 | Russell et al. | ............... 370/389 |

FOREIGN PATENT DOCUMENTS

| EP | 0969617 A | 1/2000 |
| EP | 1014603 A2 | 6/2000 |

OTHER PUBLICATIONS

SDH Telecommunications Standard Primer, downloaded from http://www.tek.com on Oct. 9, 2000.

(Continued)

*Primary Examiner*—Ricky Ngo
*Assistant Examiner*—Pao Sinkantarakorn
(74) *Attorney, Agent, or Firm*—Nixon & Vanderhye PC

(57) ABSTRACT

A communications network including nodes which permit networks to be tunnelled across intermediate networks. The present invention has application, in particular, to SDH networks, SONET and OTN. The content of entities for transportation across an existing network are mapped into a series of subframes and are virtually concatenated across the network. Each subframes is assigned a sequence indicator, which allows the original entity to be assembled at a remote node.

7 Claims, 11 Drawing Sheets

OTHER PUBLICATIONS

Synchronous Digital Hierarchy (SDH) Tutorial, downloaded from http://www.iec.org on Sep. 21, 2000.
Alidian Releases Intelligent Software, downloaded from http://www.nwfusion.com/cgi-bin/mailto/x.cgi on Jan. 14, 2001.
Inverse Multiplexing, downloaded from http://whatis.techtarget.com/definition on Jan. 14, 2001.
Alidian Adds Ethernet Service Intelligence to Metro DWDM Systems, downloaded from http://www.alidian.com/news/press/2001/100801.shtml on Jan. 14, 2001.
ITU-T Recommendation G.783 (Oct. 2000) "Characteristics of Synchronous Digital Hierarchy (SDH) Equipment Functional blocks".
ITU-T Recommendation G.703 (Nov. 2001) "Physical/Electrical Characteristics of Hierarchial Digital Interfaces".
ITU-T Recommendation G.707 (Mar. 1996) "Network Node Interface for the Synchronous Digital Hierarchy (SDH)".
ITU-T Recommendation G.709/Y. 1331 (Feb. 2001) "Interfaces for the Optical Transport Network (OTN)".
ITU-T Recommendation G.811 (Sep. 1997) "Timing Characteristics of Primary Reference Clocks".
ITU-T Recommendation G.812 (Jun. 1998) "Timing Requirements of Slave Clocks Suitable for Use as Node Clocks in Synchronization Networks".
ITU-T Recommendation G.813 (Aug. 1996) "Timing Characteristics of SDH Equipment Slave Clocks (SEC)".
ITU-T Recommendation G.832 (Oct. 1998) "Transport of SDH Elements on PDH Networks—Frame and Multiplexing Structures".
ITU-T Recommendation G.872 (Feb. 1999) "Architecture of Optical Transport Networks".
Cavendish, "Evolution of Optical Transport Technologies: From SONET/SDH to WDM" IEEE Communications Magazine, Jun. 2000, pp. 164-172.
Brown, "SONET: Still an Absolute Necessity", Telecommunications (Americas Edition), vol. 33, No. 7, pp. 49-50, Jul. 1999.
Kapadia, "Vendors Gear Up for Broadband Celebration", Telephony, vol. 229, No. 10, p. 16, Sep. 4, 1995.
Hawley et al., "Getting to the Pulse on Time (Part 2)", vol. 222, No. 8, pp. 42-52, Feb. 24, 1992.
Almeida et al, "Photon-Evaluating Key Issues of Optical Transport Networks and Demonstrating Their Feasibility", Proceedings of the SPIE—The International Society for Optical Engineering, vol. 3211, 1997, pp. 672-811.
Clark, "Evolution of Optical Transport in the AT&T Network", OFC '98 Optical Fiber Communication Conference and Exhibit. Technical Digest Conference Edition 1998 OSA Technical Digest Series vol. 2, p. 70.
Wu-Jhy, "Lightwave Transmission Network In Taiwan", Conference on Optical Fiber Communications. Technical Digest. Postconference Edition, 1997, OSA Technical Digest Series vol. 6, pp. 63-64.
Almeida et al, "Photon-a Progressive Step Towards Optical Transport Networks in Europe", Broadband Superhighway, NOC '96. Proceedings of the European Conference on Networks and Optical Communications, 1996, pp. 174-181.
Lowe et al, "An Optical Transport Platform", IEE Colloquium on WDM Technology and Applications 1997, pp. 7/1-5.
Johansson et al, "An Optical Transport Network Layer-Concept and Demonstrator", Ericsson Review, vol. 71, No. 3, 1994, pp. 134-143.
Chidgey, "Multi-Wavelength Transport Networks", IEEE Communications Magazine, Dec. 1994, pp. 28-35.
Miki, "Optical Transport Networks", Proceedings of the IEEE, vol. 81, No. 11, Nov. 1993.
Sexton et al, "Transmission Networking SONET and the Synchronous Digital Hierarchy" XP-002174017, 1993.
Makam et al, "Dynamic Control of SONET/SDH/WDM Transport Networks to Carry Data Traffic More Efficiently", XP-002176732, Nov. 11, 2000.
Ballart et al, "SONET: Now It's the Standard Optical Network", XP 000112349, Mar. 1989.
Kinoshita et al, "Synchronization and Multiplexing of HDTV Signals for Transmission in Broadband ISDN", XP 00311074, 1992.
Brungard, "Draft ITU-T G.709", XP-000955613Nov. 7, 2000.
Ndousse et al, "PPP Extensions for IP/PPP-HDLC Over SONET-SDH/WDM", XP-000898331, Jun. 6, 1999.
Asatani et al, "CCITT Standardization of Network Node Interface of Synchronous Digital Hierarchy", XP 000150848, Aug. 1990.
"Synchronous Optical Network (SONET)—Payload Mappings (inclusion of Virtual Concatenation)", XP-000949003, 2000.

* cited by examiner

METHOD AND APPARATUS FOR TUNNELLING DATA IN A NETWORK

This application is the U.S. national phase of international application PCT/GB02/00361 filed 28 Jan. 2002 which designated the U.S.

BACKGROUND

1. Technical Field

The present invention relates to a method and apparatus for tunnelling data in a network. In particular, but not exclusively, the invention relates to an optical communications network such as synchronous digital hierarchy (SDH) networks or synchronous optical network (SONET) or an optical transport network.

2. Related Art

SDH and SONET are standards for telecommunications networks. SDH is an International Standard. It is used throughout Europe. It is also used in other countries for international connections. SONET has been standardised for use in the US and Japan. The present invention is applicable to both SDH or SONET. Communication networks for transporting SDH or SONET traffic are well known. SDH and SONET have become the dominant formats for transport in both national and international networks. In Europe, for example, as demand for bandwidth has increased, SDH has kept pace, with a capability to support client bit rates that span five orders of magnitude, from 1.5 Mbit/s to about 40 Gbit/s. The SDH and SONET networks are not described in greater detail here, as the present invention is compatible with existing SDH and SONET networks. However, where necessary for the present invention to be understood, further details are given below. Where transmission and formatting occurs with reference to a particular standard, these standards are referred to in the description. Prior to transmission of data over an SDH or SONET network, the data is formatted into a frame. The SDH or SONET frames last 125 microseconds. There are thus, 8000 frames per second. The frame includes an overhead area, which includes management data and a payload area (also known as a virtual container capacity) which includes the data for transmission. As the SDH or SONET frames are transmitted through the SDH or SONET network, respectively, all or certain parts of the overhead area are accessed by various network elements. At the network nodes the data contained in the overhead area is converted from the optical domain to the electrical domain. The network nodes process the electronic overhead data using standard digital processing techniques. The payload data is transmitted unaffected by the network elements through the network to a network termination equipment depending on the management information contained in the overhead area. Depending upon the type of processing point, eg. regenerator, multiplexer, demultiplexer, add-drop multiplexer, digital cross connect, etc, some or all of the overhead area may be accessed.

A problem with the present SDH and SONET frame structures is that because data contained in the overhead area may be accessed at network elements, it is not possible to transparently transport SDH or SONET frames over an SDH or SONET network, i.e. it is not possible to transport complete SDH or SONET frames over their respective networks intact without data in the overhead area being accessed, and in many circumstances removed or replaced.

BRIEF SUMMARY

We have found that by mapping SDH or SONET frames in a particular way prior to transmission, they may be tunnelled across existing SDH or SONET networks without the management information being accessed. One advantage is that a network operator is able to manage a remote SDH or SONET network via an intermediate SDH or SONET network that may not necessarily fall under his management responsibility. Similarly, it effectively allows operators to transport the management data over an SDH or SONET network (i.e. the management information necessary to operate SDH or SONET) over its own network, without the transported management data being accessed or corrupted. Operators may wish to carry their own SDH or SONET management data over their SDH or SONET networks. Alternatively, third parties may transmit their management data over the operator's network.

In addition to SDH networks and SONET, the telecommunications industry is currently creating new standards to develop the next generation of transport network, known as the optical transport network (OTN) within the ITU-T. The optical transport network is intended to be a multi-service network that supports a wide variety of layers including SDH STM-N (synchronous transfer modules, where N=0, 1, 4, 16, 64 and N indicates the bit rate of the module), SONET, asynchronous transfer mode (ATM), internet protocol (IP), as well as other formats, i.e to provide a universal transport medium for high bandwidth services. The optical transport network (OTN) is based on a digital frame format which differs from those previously proposed. Reference is made to the ITU standards at the heart of the optical transport network. These are G.872 and G.709. The present invention does not require any changes to be made to the proposed frame structure of the entities to be transported over the optical transport network as set out in the standards. Thus, the entities are described below only insofar as the present invention requires. As with SDH and SONET, an optical transport network transfers data in frame formats having a payload area and an overhead area. Client signals are mapped into the payload area of the frame structure. As with SDH and SONET, the digital frame format provides an overhead area for managing each signal carried on an optical carrier. This overhead area, as with SDH and SONET is, depending on the type of network node, accessed at network nodes. The digital data frame to be carried on the optical transport network is called an optical transport unit (OTU). Its format is set out in G.709. FIG. 8 shows one typical structure of an optical transport unit and this is described in the detailed description hereinbelow. In brief, the payload to be carried for the client, i.e. the client signal, which may for example be ATM, SDH, STM-N, IP etc, is mapped into an optical payload unit (OPU). The optical payload unit comes in different data rate sizes. For example, an optical payload unit1 is approximately 2.5 Gbit/s, an optical payload unit 2 is approximately 10 Gbit/s and an optical payload unit 3 is approximately 40 Gbit/s. The optical payload unit (OPUk, where k is equal to 1, 2, 3) frame structure has two main areas, the OPUk overhead area and the OPUk payload area, into which the client is mapped. The OPUk is then mapped into an optical data unit (ODUk, where k is equal to 1, 2, 3). The two main areas of the ODUk frame are the ODUk overhead area and the OPUk area. The ODUk overhead area includes the management information for the frame. The ODUk is then mapped into an optical transport unit (OTUk, where k is equal to 1, 2, 3). The main areas of the OTUk are the ODUk, a forward error correction area (FEC) and some reserved area for OTUk overhead. The k values for an OPUk, ODUk and an OTUk do not have to be the same (i.e. an OPU1 does not have to be mapped into an ODU1, and an ODU1 does not have to be mapped into an OTU1.

Although, there are clear benefits to be had from a universal, optical transport mechanism, such as an optical transport network, the frame structures of optical transport network data entities proposed by the standard ITU-T Recommendation G.872 (2000), in particular the ODUks and the OTUks are not suitable for transportation over existing standardised SDH networks or SONET networks.

Thus, if OTNs are to be developed, the telecommunications industry is faced with the problem of having to deploy a new transport network infrastructure. A new optical network would require the development and purchase of completely new network components, plus the introduction of a new network management control system to monitor and operate it. This could be done as an overlay network or a replacement network. Either of these would be very expensive.

We have found, however, that by mapping optical transport units (OTUks) or optical data units (ODUks) in a particular way, it becomes possible to transport the mapped entities across an existing SDH or SONET network. In other words the optical transport network data entities are carried by SDH or SONET networks, ie. The optical transport network data entities are "clients" of SDH or SONET. This allows the existing SDH infrastructure to be exploited to provide new services based on OTN entities. It also avoids the need for large-scale deployment of a new transport network infrastructure.

We have found that the applications and advantages of the present invention include: Transport of optical transport network optical data units over SDH. During the transition from SDH to an optical transport network there will be many instances where it will be advantageous to interconnect optical transport network nodes using existing SDH paths.

The long haul submarine links that have many years of active life left are attractive candidates, as are large legacy networks.

Transport of optical transport network optical transport units over SDH. Transport of other transport frames that encapsulate other transport formats such as SDH, IP, ATM, Frame-relay, and indeed almost any format that can be turned into ones and noughts at a constant bit rate.

Transport of an SDH STM-N frame over the SDH network. A network operator is enabled to transport Optical Transport Network data entities, i.e optical data units and/or optical transport units over other network operators SDH infrastructure. A network operator is enabled to transport optical Transport Network data entities (ODU and/or OTU) from other network operators' over their own infrastructure after converting the data entities into SDH data entities.

The invention provides an extension to the useful life of the SDH and SONET platforms.

In accordance with a first aspect of the invention, there is provided a method of tunnelling a first frame which includes data in an overhead area and in a payload area, from a first network to a second network via an intermediate network, a first node being disposed between said first network and said intermediate network and a second node being disposed between said intermediate network and said second network, the method including the steps of:

a. at said first node, mapping said data of the first frame into the payload areas of a plurality of second frames, the second frames further including an overhead area which includes overhead data relating to the transport of the second frames over the intermediate network, assigning an identifier to each overhead area of each of said second frames, and outputting said second frames onto said intermediate network;

b. transporting said second frames across said intermediate network to said second node in accordance with said overhead data; and c. at said second node, receiving said plurality of second frames, accessing each of said identifiers, reassembling said first frame from the payload areas of said second frames using the identifiers accessed from said second frames, the reassembled first frame including data in an overhead area and in a payload area, and outputting said reassembled first frame onto said second network.

Those skilled in the art will recognise that this embodiment encompasses tunnelling a frame across an existing SDH or SONET network. Thus, in accordance with the present invention, existing SDH networks are enabled to support all of the services that can be supported by the optical transport network for networking of STM-N frames. This allows for optical transport network based services to be supported with minimum network build during early stages of optical transport network deployment.

In accordance with a second aspect of the present invention, there is provided a signal processor for use in step a) of claim 1, for mapping a first frame which includes data in an overhead area and in a payload area, into a plurality of second frames, the signal processor including an input for receiving said first frame of data, an output for outputting the second frames, and processing means for mapping said data of the first frame into the payload areas of the plurality of second frames, the second frames further including an overhead area which includes overhead data relating to the transport of the second frames over the intermediate network, said node further including assignment means for assigning to each of said second frames an identifier.

In accordance with a third aspect of the present invention, there is provided a signal processor for use in step c) of claim 1, for reassembling a first frame of data from a plurality of second frames of data, including an input for receiving a plurality of second frames, an output for outputting said first frame, accessing means for accessing identifiers assigned to each of said second frames, and reassembling means for reassembling said first frame using said identifiers accessed from said second frames.

In accordance with a fourth aspect of the present invention, there is provided a tunnelling apparatus for tunnelling a first frame which includes data in an overhead area and in a payload area, from a first network to a second network via an intermediate network, said apparatus including a first node having an input for receiving the first frame from the first network and an output for outputting a second frame onto an intermediate network, and a second node having an input for receiving said second frame from said intermediate network and an output for outputting a reassembled first frame onto a second network, wherein said first node further includes a mapper for mapping said data of the first frame into payload areas of a plurality of second frames, the second frames further including an overhead area which includes overhead data relating to the transport of the second frames over the intermediate network, said first node further including an assignment means for assigning an identifier to the overhead area of each of said plurality of second frames, and wherein said second node further includes accessing means for accessing said identifiers and reassembling means for reassembling said first frame from said plurality of second frames using said identifiers.

BRIEF DESCRIPTION OF THE DRAWINGS

In order that the invention may be more fully understood embodiments thereof will now be described, by way of example only, reference being made to the accompanying drawings in which.

DETAILED DESCRIPTION OF EXEMPLARY EMBODIMENTS

Figure 1:
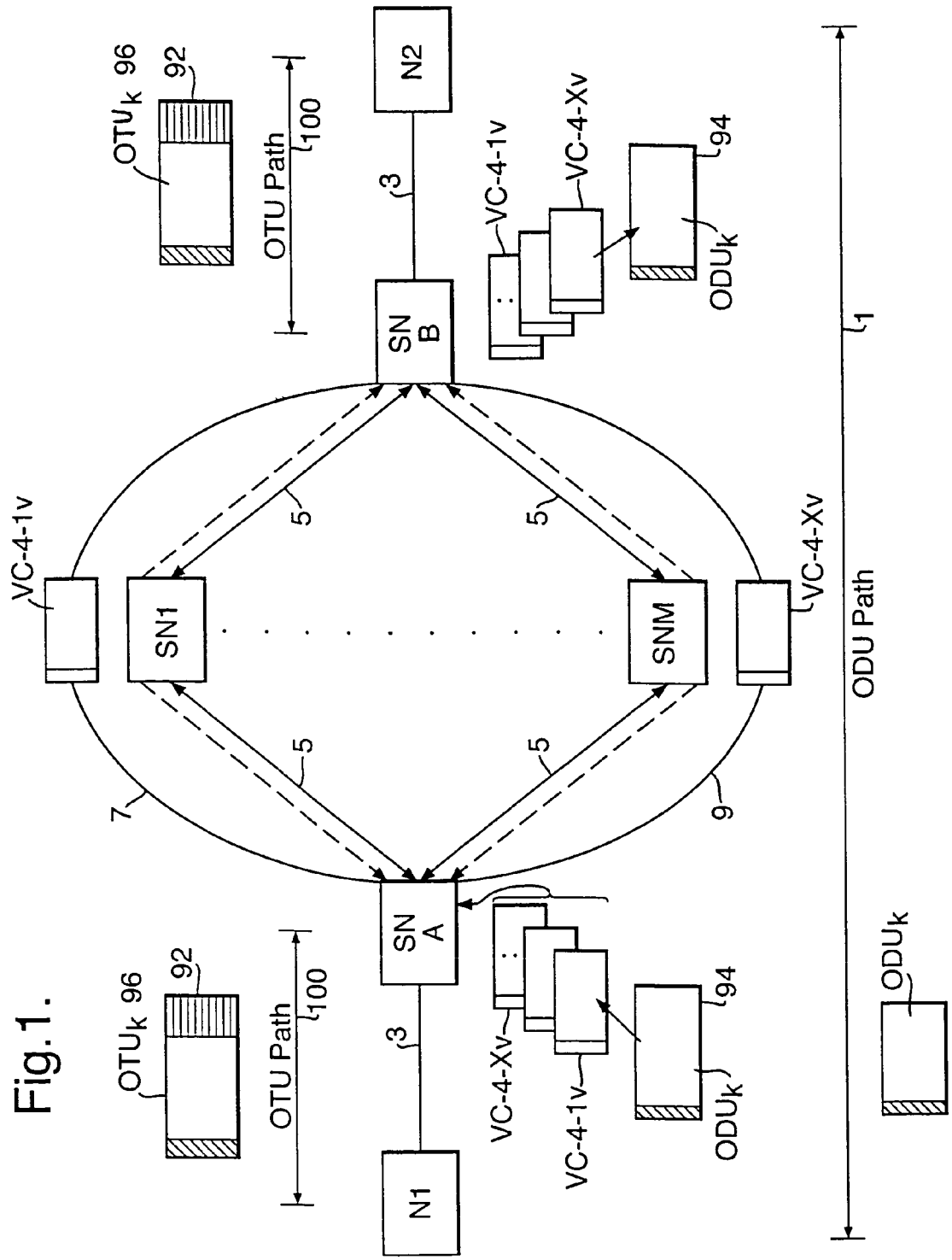
FIG. 1 shows a communications link for transmission of an optical entity including nodes according to the present invention.

Referring to the drawings, the present invention is applicable to the transmission of various data formats, also known as "entities", including SDH entities, SONET entities and optical transport network entities. Preferably, the second frames are SDH or SONET data frames. The first data frames are either preferably SDH or SONET data frames or optical transport network data frames. Also, according to the present invention data is mapped from the overhead area and the payload area of the first frame into the payload area of the second data frame.

Figure 8:
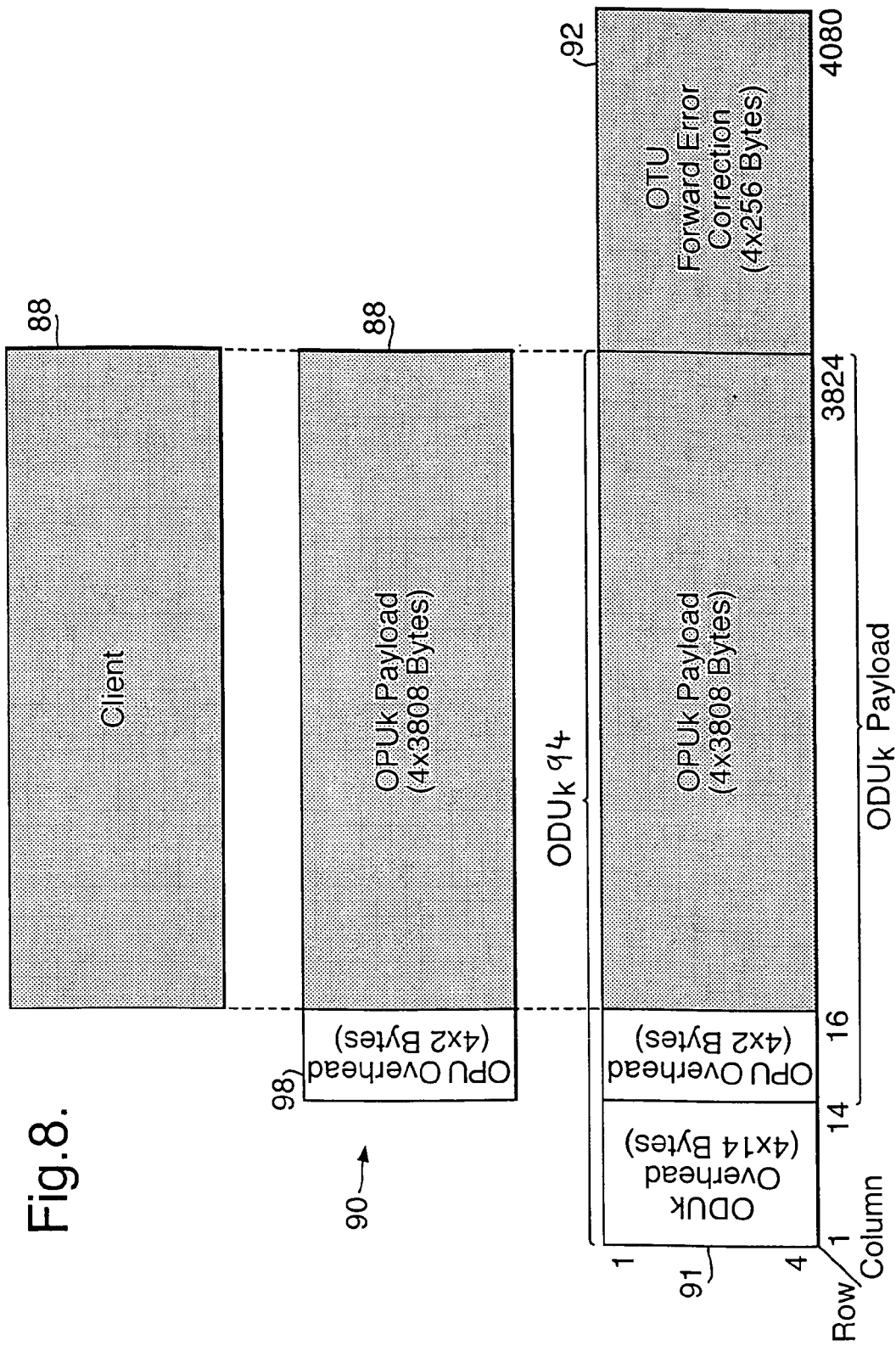
FIG. 8 shows the relationship between the optical payload unit (OPU), the optical data unit (ODU) and the optical transport unit (OTU)

FIG. 8 is referred to as it shows useful background to optical transport network entities useful for appreciation of the invention described below. FIG. 8 shows the relationship between the optical payload unit 90, the optical data unit 94 and the optical transport unit 96. The optical transport unit 96 is the entity carried on each wavelength in the optical transport network by means of optical channels. The ITU-T is currently developing a suite of recommendations that describe the optical transport network. A central recommendation is G.872, providing the architectural framework for the optical transport network. Reference is made to ITU-T Recommendation G.872 (2000), "Architecture of optical transport networks". It is based on a network model that contains three layers;

An optical channel, OCh, layer network that provides end-to-end networking

An optical multiplex section, OMS, layer network that provides functionality for transport of a multi-wavelength optical signal formed from a multiplex of optical channels An optical transmission section, OTS, layer network that provides functionality for transmission of optical signals on optical fibre. This layer network also transports an optical supervisory channel on a separate wavelength for management and supervision of optical network elements.

Each optical channel is an optical carrier that supports a digital, optical transport unit 96. Three bit rates are defined for an optical transport unit 96, corresponding to approximately 2.5, 10 and 40 Gbit/s. These rates are represented, by k, the order of an optical transport unit. An optical transport unit k, where k is equal to 1,2,3 is composed of the following entities:

An optical payload unit of order k, 90 is an octet based frame structure comprising 4 rows and 3810 columns. This structure is subdivided into an overhead area, equivalent to the first two columns and a payload area of 3808 columns. The format of the overhead area 98 is dependent on the type of client mapping.

An optical data unit of order k, 94. This is an octet based frame structure with 4 rows and 3824 columns that encapsulates an optical payload unit of order k, 90 and adds 14 additional columns of ODU overhead area 91. This overhead area 91 includes a frame alignment signal, general communications channels, maintenance signals, path monitoring, tandem connection monitoring, protection control channels and experimental bytes.

An optical transport unit of order k, 96. This is an octet based frame structure based upon the optical data unit frame structure with an additional 256 columns to provide a forward error correction area 92, also known as an FEC. A standard forward error correction area 92 based on G.975 is used at inter-domain interfaces, between operators or vendors. Reference is made to ITU-T Recommendation G.975 (2000), "Forward error correction for submarine systems" (to be published). At other points in the network a different FEC scheme and/or number of columns for FEC 92 may be used. This allows vendors flexibility to exploit changes in technology whilst allowing interworking at agreed points in the network.

These entities and their relationships are shown in FIG. 8. Further detail is not necessary for understanding of the present invention. However, a more detailed description of the frame structure can be found in G.709. Refer to ITU-T Recommendation G.709 (2000), "Network node interface for the optical transport network (OTN)" To be published. The upto date version in December 2000 of G.709 defines mappings for OPU-ODU-OTU only for cases where k has the same value for each entity. There is, however, interest in digital multiplexing according to the following rules:

four ODU1s are mapped into an ODU2, which is mapped into an OTU2, four ODU2s are mapped into an ODU3, which is mapped into an OTU3, and sixteen ODU1s are mapped into an ODU3, which is mapped into an OTU3.

This will produce a digital multiplexing hierarchy similar to that of SDH. One argument often used in favour of such a hierarchy is that it allows maximum utilisation of optical bandwidth. This will result in the need for both optical channel cross-connects that switch in the optical domain and digital cross-connects that switch ODU entities. Such a network would be a direct competitor to SDH.

FIG. 1 shows apparatus incorporating the present invention. A network is shown, over which an optical entity is transmitted. In the example shown in FIG. 1 an optical transport network entity is transmitted across a communications link. However, as mentioned above, the entity for transmission is not limited to an optical transport network entity, but may alternatively be an SDH or SONET entity. The communications link includes a first optical transport network node N1 and a second optical transport network node N2. Separate nodes N1 and N2 are conventional and may each form parts of an optical transport network. Further optical transport nodes may be disposed upstream of node N1 and downstream of node N2, respectively. Alternatively, node N1 may simply generate optical transport units for transportation, and node N2 may be a receiver for optical transport units. In both cases, the output of node N1 is arranged to output optical transport units, and the input of node N2 is arranged to receive optical transport units. The present invention allows the transmission of an optical transport unit of the order k (OTUk) over an optical transport unit path from optical transport network node N1 to optical transport network node N2 without the content of the optical transport unit of order k being changed. The node N1 is linked via an optical fibre 3 to a node SNA, which is suitable for processing SDH signals and which includes a signal processor. Node SNA is described in further detail with reference to FIGS. 2, 3 and 4. Node SNA is linked via optical fibres to a plurality of conventional SDH nodes (SN1, SN2, . . . SNM) 10, 12, and via further optical fibres to a node according to a second aspect of the present invention, SNB. Node SNB is described in further detail with reference to FIGS. 5 and 6. SNB is further linked via an optical fibre to node N2. Conventional SDH nodes SN1 to SNM represent a conventional SDH network. The transport route over which the entity is transported comprises portions 5, which are shown in FIG. 1 between SNA and each of conventional SDH nodes SN1 to SNM and between each of conventional SDH nodes SN1 to SNM and node N2, at the end of each transport portion 5, the signal may be regenerated for further transmission. Of course, a network may include other transport portions or sections, however, for the sake of simplicity these are not shown.

Optical entities transmitted over nodes SN1 to SNM are processed in a manner typical of SDH networks, i.e. at each of nodes SN1 to SNM certain areas containing management data, for example the A1, A2, J0 and B1 bytes of the entities' overhead areas are accessed, read and replaced with new management data for determining the management of the entity in its further transportation, before the entity is output for further transportation on the network.

In the example shown in FIG. 1 the optical transport network node N1 outputs an optical transport unit of order k 96 by adding a forward error correction data 92 to an optical data unit of order k 94 (whose generation is not shown) for transport across the optical transmission unit path 100 to node SNA. At node SNA the forward error correction data 92 is stripped from the optical transport unit of order k 96 to produce the optical data unit of order k 94. In addition, at node SNA a signal processor maps the resulting optical data unit of order k frame content including both the overhead area and the payload area into virtual container-4 paths. This is in contrast to conventional SDH or SONET nodes which terminate the incoming frames, taking only the contained payload area for further transmission.

A virtual container is the basic payload carrying unit of SDH frames. For a full discussion of virtual containers, reference is made to "Broadband networking: ATM SDH and SONET", Sexton & Reid publisher Artech House or ITU-T Recommendation G.707.

As described in further detail below the number "4" indicates the size of the virtual container. Virtual containers (also referred to hereinbelow as VCs) may be transported in the SDH frame as data packages. The virtual container has its own frame structure. The first column is typically reserved for the path management data as the overhead area, the remainder of the virtual container is reserved for payload. There exist different sizes of virtual container. For example, a virtual container-4 (VC-4) has a digital bit rate of 150.336 Mbit/s, and a frame size of 9 rows and 261 columns. In the example shown in FIG. 1, the optical data unit of order k 94 is mapped into the payload area of a plurality of VC-4s. The signal processor further inserts in the overhead area of each VC-4 the management data necessary to manage the transportation of each of the relevant VC-4s over the network. The signal processor further inserts in the overhead area of each VC-4 a unique identifier H4 (see FIG. 9) which identifies the position of each VC-4 within the plurality of VC-4s that are generated. The VC-4s including their own management data are packed into STM-N frames, the standard format for SDH transport. Because each VC-4 includes its own respective management data, the VC-4 may then be transported independently of each other across the network. This further enables each VC-4 to be switched in the network independently of other VC-4s. This aspect of the invention is discussed in greater detail below.

The invention is not limited to the mapping of optical data units of order k in to VC-4s. For example, the optical data unit of order k may also be mapped into other size virtual containers. For example the optical entity may be mapped into VC-3, VC-2, VC-12 and VC-11. For transportation of optical data units of order k across SONET networks, for example, the optical data unit may be mapped into a synchronous payload envelope (equivalent to a VC-3), which is referred to as a synchronous tranport signal-level 1, or STS-1.

Figure 2:
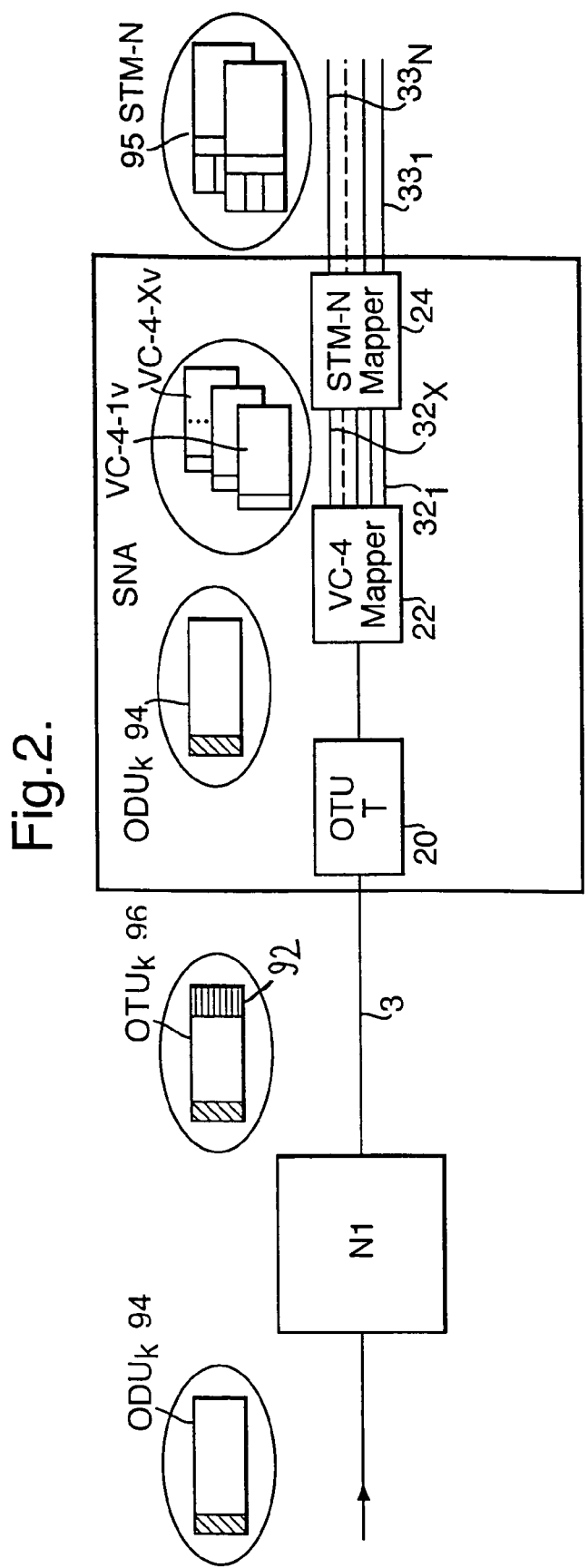
FIG. 2 shows a more detailed illustration of part of the communications link shown in FIG. 1, including an optical transport network node and a node according to the present invention.
Figure 3:
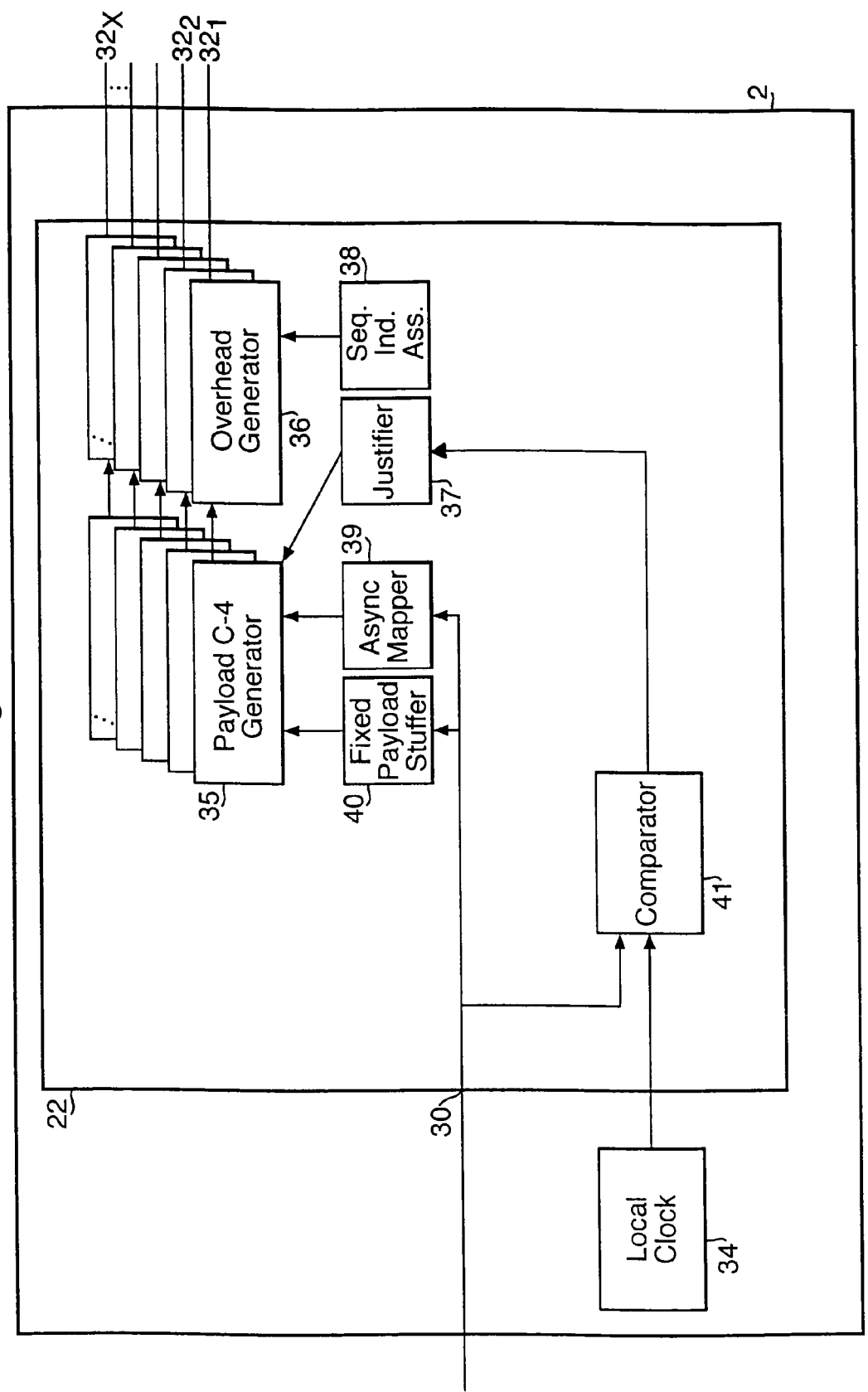
FIG. 3 shows a detailed illustration of the structure of an optical signal processor according to the present invention, which is included in the node shown in FIG. 2.
Figure 4:
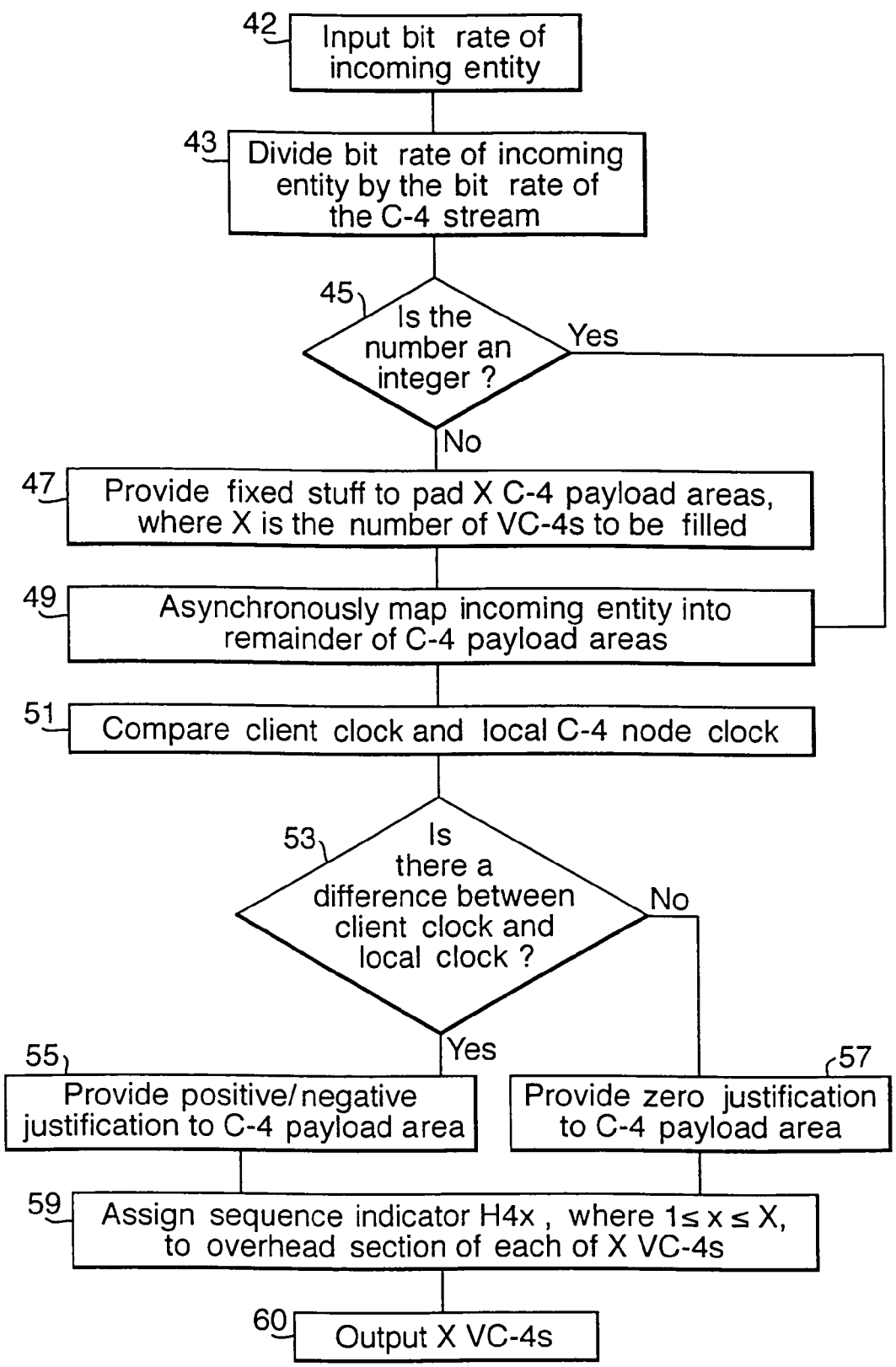
FIG. 4 shows a flow diagram illustrating the function of the optical signal processor according to the present invention.

Depending on the size and format of the optical data unit of order k, the optical data unit of order k will be mapped into X, where X is an integer, VC-4 containers. FIGS. 2, 3 and 4 show in further detail how the optical data unit of order k is mapped into X VC-4s.

The management data and unique identifiers assigned to each VC-4 allow the plurality of VC-4s to be virtually concatenated across any one of nodes SN1 to SNM to SNB.

Concatenation will now be described. SDH provides a mechanism, concatenation, to allow for transport of specified payloads that do not map efficiently into one of the lower order (VC-11, VC-12, VC-2 or VC-3) or higher order (VC-3 or VC-4) paths. VC-4 concatenation, for example, allows for the transport of payloads with a capacity greater than one VC-4. For a full discussion of concatenation reference is made to ITU-T Recommendation G.707. There are two types of concatenation, contiguous and virtual. Both forms provide a concatenated bandwidth of X times the bandwidth of a Container-N at the path termination. The difference between the two is in the manner that bandwidth is transported.

In the contiguous form the bandwidth of X container-Ns is bound together to form a single payload area and a single overhead area that together are transported over the SDH network as a single bandwidth entity. The concatenated container consists of a single payload area that is X times that of a container-N and X columns of overhead. Since a contiguous container is effectively a single large container only one column of overhead is used for transport of management information in a manner similar to a container-N. The other X-1 columns of overhead are filled with fixed stuff.

In order to indicate that the container is contiguously concatenated SDH uses a concatenation indicator in the administrative unit pointer (e.g. AU-4) as described in ITU-T Recommendation G.707.

Contiguous concatenation is described using the following notation:

VC-n-Xc where n is equal to the order of the virtual container, X is an integer value describing the number of virtual containers that are coupled together and c indicates that the form of concatenation is contiguous. For VC-4 contiguous concatenation the allowable values of X are 4, 16, 64 and 256. The minimum interface rate that can support a VC-n-Xc is a synchronous transport module (STM) of order X. Support of contiguous concatenation requires concatenation functionality at each network element in the VC-n-Xc path.

The present invention uses virtual concatenation—a type of inverse multiplexing. In inverse multiplexing rather than combining separate data channels on a common communications link (as is the case for multiplexing), a data channel is divided and transmitted over a plurality of separate communications links.

In the present invention, the virtual containers are virtually concatenated, which is illustrated in FIG. 1. The optical data unit of order k is signal processed by a signal processor disposed at node SNA so that the virtual containers generated are able to be transported using virtual concatenation. This is achieved by a signal processor disposed at SNA for distributing the payload of the client, that is the optical data unit of order k 94, between X individual virtual containers. Each virtual container includes an overhead area where management data for each virtual container is inserted for access and replacement during transportation through the network. This allows the virtual containers to be virtually concatenated across the network before being recombined at node SNB to form the original payload. Because each virtual container includes its overhead area its own management data, there is no requirement for each of the individual VC's to follow the same route across the network. At the node SNB, where the virtually concatenated virtual containers are terminated, when the VC-n-Xv is terminated, it is necessary to compensate for the differential delay that results from using different network connections. In the case of VC-4 virtual concatenation the maximum delay tolerated is limited to 125 μs. For the present invention, only the path termination equipment, which in FIG. 1 is disposed in node SNB includes functionality to process virtually concatenated data entities. It is not necessary to adapt intermediate network nodes SN1 to SNM to include any functionality that extends beyond conventional SDH or SONET nodes. As mentioned above, nodes SN1 to SNM are conventional SDH nodes.

Virtual concatenation may be described using the following notation:

VC-n-Xv

Where n is equal to the order of the virtual container, X is an integer value describing the number of virtual containers, and v indicates that the form of concatenation is virtual. For VC-4 virtual concatenation the allowable values of X are any integer value within the range 2 and 256.

Although, virtual concatenation of some data formats is known, its application is limited. Prior to the present invention, virtual concatenation could only be used for the following applications:

transport of asynchronous transfer mode (ATM) virtual path client layer networks, transport of high level data link control (HDLC) framed signals, including internet protocol (IP), contiguous to virtual concatenation conversion.

Whilst virtual concatenation for data formats has been restricted to only a small number of client layers with simple mappings, the inventors have found that it may also be applied to the transport of optical transport network (OTN) as well as other entities, including SDH.

Thus, using the notation defined above, in FIG. 1 the optical data unit of order k is mapped into X VC-4 containers, VC-4-1v to VC-4-Xv. Each virtual concatenated VC-4 is assigned within the VC-4 overhead area a unique identifier, in particular, a sequence indicator, which allows each of the virtual container-4s, 1 to X to have their position within the sequence of virtual containers identified, so that when the virtual containers arrive at the termination equipment the virtual containers can be reordered in their correct sequence.

At node SNB, the VC-4s are terminated. The sequence indicators in each VC-4 are accessed to enable the original optical data unit of order k to be assembled. An assembler disposed at the node SNB assembles the original data entity from the virtual containers received at the node SNB. How the signal processor disposed in node SNA map and the assembler disposed in the node SNB reassemble the original data entities, in the example shown, the optical data units of order k 94, is discussed below in more detail with reference to FIGS. 3, 4, 5, 6 and 7. The node SNB outputs an optical data unit of order k 94. The content of the optical data unit of order k 94 output from the node SNB is substantially unchanged from that mapped at the node SNA, once the forward error correction data 92 of the optical transmission unit of order k 96 had been stripped. Thus, a network operator is able to transmit an optical data unit of order k 94 including its overhead area from one optical tranport network node N1 to a second, or remote optical transport network node N2 via conventional SDH nodes SN1 to SNM, without any of the data in the overhead area of the optical data unit of order k 94 being changed en route. The present invention achieves this result with the provision of two interfaces: a signal processor disposed in the node SNA and an assembler disposed in the node SNB. Of course, the invention is also applicable to other situations where a network operator may wish for certain parts of an optical data unit of order k 94, or other entity, to be transmitted unchanged, whilst it may be desired that other parts of the optical data unit of order k 94 overhead area should be accessed.

In the example shown, further to assembling the optical data unit 94 of order k, from the received VC-4s, there is disposed means at node SNB to optionally add forward error correction data 92 to the assembled optical data unit of order k to form an optical transport unit 96 of order k for transportation across an optical transport unit path 100 of order k, at the end of which at node N2 the optical transport unit of order k may be terminated.

In the example shown, the VC-4s are transmitted independently over the nodes SN1 10 to SNM 12. The mapping of each of the VC-4s into STM-N format is conventional and standardised. For full details reference is made to "Broadband networking: ATM SDH and SONET" Sexton & Reid publisher Artech House or G.707. If the VC-4s in FIG. 1 were to be mapped into an STM-N frame, there would be M (where M is less than N) STM-N outputs from node SNA, because an STM-N frame where N is greater than 1 (4, 16, 64) has payload capacity to carry more than one VC-4, FIG. 2 shows in more detail the format of the data entities concerned as well as the mapping stages that take place between the input to the optical transport network node N1 and the output of node SNA at which the signal processor 22 for carrying out the mapping is located. At the input to the optical transport network node N1, optical data unit frames 94 of order k are received. The optical transport network node N1 adds forward error correction data 92 to the optical data unit frame 94 of order k to form an optical transport unit frame 96 of order k. The optical transport unit frame 96 of order k is output from the optical transport network node N1 and transmitted to node SNA, where the optical transport unit of order k is terminated and mapped. For terminating and mapping the optical transport unit frame 96 of order k, the node SNA includes an optical transport unit of order k termination point 20 and a VC-4 mapper 22. The node SNA further includes a conventional STM-N mapper 24 for mapping the VC-4s into standard STM-N frames for transportation over the standard SDH network. The optical transport unit frame 96 of order k received at the optical transport unit termination point 20 is terminated, i.e. the forward error correction data 96 is stripped from the frame and the optical transport unit overhead processed resulting in an optical data unit frame 94 of order k. The optical data unit frame 94 of order k is then received and processed by the VC-4 mapper 22. The VC-mapper 22 outputs $32_1$ to $32_X$ a plurality X of VC-4s, each of which have their own overhead areas within which a sequence indicator is assigned. The number of outputs will depend on the number, X, of VC-4s generated. Each overhead area of each VC-4 further includes management data for managing the transmission of each VC-4 across the network to node SNB. The VC-4s are received by a plurality of inputs and processed by the STM-N mapper 23 which maps the VC-4s into standardised STM-N frames 95 before they are output on a plurality of outputs $33_1$ to $33_N$ from node SNA. The number, N, of outputs from the STM-N mapper will depend on the number of STM frames into which the VC-4s are mapped. The VC-4s as encapsulated in the STM frames are then transported across a conventional SDH network. It is noted that the sequence indicator included in the overhead area is not accessed at intermediate nodes by virtue of its position within the overhead. However, data contained in the overhead areas of the virtual containers, including the sequence indicators may be observed by components, such as nodes, in the network, as the virtual containers are transported through the network.

FIG. 3 shows one preferred structure of the VC-4 mapper 22 included in the node SNA shown in FIGS. 1 and 2. The VC-4 mapper 22 is a signal processor. The optical data unit of order k frame 94 is received at the input 30. The VC-4 mapper 22 is adapted for the data rate of the incoming entity. This data rate will vary depending on the type of entity. The VC-4 mapper 22 shown in FIG. 3 is adapted to receive optical data units of order k. However, the VC-4 mapper 22 may be further adapted to receive data entities having differing data rates, including amongst others SDH and SONET entities. The bit rate of the incoming optical transport network entity and the payload area of the virtual container to be filled are used to determine how many virtual containers will be filled. This will vary depending on the entity and the particular container chosen. For example, an optical data unit of the order 1 (ODU1) will be mapped into 17 VC-4s. In the example shown, the virtual container is a VC-4. The use of virtual concatenation generally utilises a number of separate virtual containers such as VC-11, VC-12, VC-2 or VC-4. However, the present invention may be extended to utilise a number of separate concatenated container such as VC-3-3c or VC-4-4c, provided that the overhead area for each separate concatenated entity includes the management data necessary to allow each separate entity to be transported in the network, and provided that each separate entity is assigned a sequence indicator. For example, an optical data unit of order 2 (ODU2) can be mapped into 68 VC-4 or alternatively 17 VC-4-4c. The use of concatenated containers may require the use of additional management data in the path overhead area. This may be achieved, for example, by using unused bytes in the path overhead area.

In the example shown in FIG. 3, the entity to be mapped is an optical data unit of order 1 and the entity into which it is mapped are VC-4s. The payload area is referred to as the C-4. If the ratio between the bit rate of the incoming entity and the bit rate of the virtual container is an integer, which is unlikely, the content of the optical transport network entity is mapped by asynchronous mapper 39 directly into the payload areas of the virtual containers. In this way the payload C-4 generator 35 generates the appropriate number of C-4 payload areas. If, as is usual, the ratio of the bit rate of the incoming entity and the payload area is not an integer, a fixed payload stuffer 40 provides a fixed amount of extra payload into each payload area of the container before the content of the optical transport network entity is mapped into the remaining payload area by the asynchronous mapper 39. A local clock is preferably disposed local to the node SNA. Alternatively, it may be disposed within the mapper 22. The bit rate of the incoming optical transport entity is compared by comparator 41 with the local clock 34. If there is a difference between the local clock 41 and the detected bit rate justifier 37 compensates the payload area (C-4) positively or negatively accordingly. If there is no difference, justifier 37 makes a zero justification.

A plurality of virtual container overhead areas are generated by an overhead area generator 36. An overhead area is assigned to each generated payload by the overhead generator 36. The sequence indicator assigner 38 assigns an identifier to each overhead for each generated payload, which is unique and indicates the position each VC-4 has within the series VC-4-1v to VC-4-Xv. The overhead is added to each payload C-4. The plurality of generated virtual containers are output on a plurality of outputs $32_1$ to $32_X$. The number of outputs can vary and depends on the number of virtual containers generated.

FIG. 4 shows a flow diagram describing the function of the VC-4 mapper 22. The number of VC-4's required for virtual concatenation of an optical transport network entity can be found by dividing the bit rate of the optical transport network entity by the bit rate of the payload area of the entity into which the optical transport network entity is to be mapped, for example the bit rate of the payload area of a VC-4. The bit rate of the payload area is found by multiplying the number of bits in the payload area by the number of frames per second. So for a VC-4 having 260 rows by 9 columns, transported over an SDH or SONET network, whose frame duration is 125 microseconds to give 8000 frames per second, the bit rate of the payload area is equal to 260×9×8000×8 to convert to bits.

For the example worked below, it is assumed that the client entities of interest are the optical data unit and the optical transport unit. However, SDH entities may also be mapped according to the same principles. A client data stream is divided equally between each of the C-4's. As the client data stream does not generally fill exactly an integer 45 number of C-4s, it is necessary to provide data (also known as fixed stuff) to pad the C-4 payload areas 47 and a means of mapping the client into the remainder of the payload area 49. The mapping is carried out asynchronously with respect to the clock. The mapping does not have to take place asynchronously. It may also be synchronous or plesiosynchronous with respect to the clock, although this is not necessary. For an asynchronous mapping, any frequency difference between the client and local C-4 clock 53 is accommodated by means of a justification scheme, for example, a positive/negative/zero (pnz) justification scheme 51. Any justification scheme may be used, however, provided that it is compatible with virtual concatenation. Other justification schemes may include for example, positive justification. The bit rate tolerance of an ODUk is ±20 ppm.

The pnz mapping 55,57 provides for one positive justification opportunity (PJO) and one negative justification opportunity (NJO) 55,57 in each payload area C-4 of each VC-4. Traditionally, for purely positive justification schemes, the justification ratio, which is also known as the stuff ratio, is defined as the long-run average fraction of justification opportunities for which a justification is done (i.e., for a very large number of frames, the ratio of the number of justifications to the total number of justification opportunities). In the pnz scheme, positive and negative justifications must be distinguished. This can be achieved using different algebraic signs for positive and negative justifications. With this convention, the justification ratio can vary at most (for sufficiently large frequency offsets) from −1 to +1 (in contrast to a purely positive justification scheme, where justification ratio can vary at most from 0 to 1). Let $\alpha$ represent the justification ratio, where $(-1 \leq \alpha \leq 1)$, and use the further convention that a positive $\alpha$ corresponds to negative justification and negative $\alpha$ to positive justification.

Define the following notation:

N is equal to the number of fixed stuff bytes in the C-4 payload area $R^c$ is equal to the nominal client rate (byte/s)

T is equal to the C-4 period $\beta$ is equal to the ratio of actual frequency difference between the C-4 frequency and client frequency and the nominal value of this difference (the nominal value is the frequency difference between the C-4 and client frequencies when both are nominal).

$N_f$ is equal to the average number of client bytes mapped into a C-4, for the particular frequency offsets (averaged over a large number of containers)

Then $N_f$ is given by $$N_f = R^c \beta T \quad (1)$$

However, the average number of client bytes mapped into a C-4 is also equal to the total number of bytes in the payload area (which is 260 columns×9 rows=2340 bytes), minus the number of fixed stuff bytes (N), plus the average number of bytes stuffed over a very large number of containers. The latter is equal to the justification ratio $\alpha$. Combining this with equation (1) produces $$R^c \beta T = 2340 - N + \alpha \quad (2)$$

In equation (2), a positive $\alpha$ corresponds to more client bytes mapped into the C-4 on average. However, this would correspond to negative justification. This sign convention is used so that $\alpha$ enters in equation (2) with a positive sign (for convenience).

With the above, the range of $\alpha$ for each client mapping may be determined. It will be seen in the example below that $\alpha$ is in the range [−1 to 1]. The optical transport network entities of interest in the present example are the optical data unit and the optical transport unit. As an example consider the asynchronous mapping of an optical data unit of order 1 (ODU1) signal into the payload area of a VC-4, i.e. the C-4.

The nominal rate of the client is 2498775126 bit/s (312346891 bytes). But the nominal rate mapped into each C-4 is $\frac{1}{17}^{th}$ of this or 18373347 bytes. Then $$R^c T = 18373347 * 125 \, \mu s = 2296.668375 \text{ or } 2297 \text{ bytes} \quad (3)$$

Inserting this into equation (2), and using the fact that N is equal to 43 (2340-2297), and assuming that this will be reduced by 1 to allow for the NJO, for this mapping produces $$\alpha = 2297(\beta - 1) \quad (4)$$

Since the C-4 and client frequency tolerances are each ±20 ppm (assuming SONET clock tolerance, for SDH clock tolerance it would be ±4.6 ppm), $\beta$ ranges from 0.99996 to 1.00004. Using this in equation (4) gives as the range of $\alpha$ $$-0.09188 \leq \alpha \leq +0.09188. \quad (5)$$

This approach can also be applied to describe the mapping of an optical transport unit of order 1 (OTU1), an optical data unit of order 2 (ODU2), and an optical transport unit of order 2 (OTU2) into a C-4. The values for $\alpha$ are shown in table I.

TABLE I

Mapping of optical transport network entities into SDH virtually concatenated VC-4's.

| OTN entity | Nominal bit rate kbit/s | Number of C-4s | Fixed stuff bytes per C-4 | Fixed stuff ratio (alpha) |
|---|---|---|---|---|
| ODU1 | 2498775.126 | 17 | 43 | $-0.09188 \leq \alpha \leq 0.09188$ |
| OTU1 | 2666057.143 | 18 | 25 | $-0.09256 \leq \alpha \leq 0.09256$ |
| ODU2 | 10037273.924 | 68 | 33 | $-0.09224 \leq \alpha \leq 0.09224$ |
| OTU2 | 10709225.316 | 72 | 15 | $-0.093 \leq \alpha \leq 0.093$ |

The mapping of an optical transport unit of order k (OTUk) is included as it is possible that in certain circumstances part of the field reserved for the forward error correction data (FEC) will be used for carrying other types of data. However, it is more likely that such a virtual concatenation scheme would be based on transport of optical data unit entities to minimise the overall bandwidth.

Because each VC-4 contains in its overhead area management data for its transportation across a communications link, each VC-4 may be transported independently of other VC-4s. Thus, different VC-4s may take different routes through the network. This will result in a variation existing between the arrival times of the VC-4s at the termination node SNB. In other words, due to different propagation delays of the VC-4s a differential delay will occur between the individual VC-4s. This differential delay has to be compensated and the individual VC-4s have to be realigned for access to the payload areas (Container-4s). The realignment process has to cover at upto a differential delay of 125 microseconds. A two stage 512 millisecond multiframe is introduced to cover differential delays of 125 microseconds and above (upto 256 milliseconds). The first stage used H4 bits 5-8 for the 4 bit multiframe indicator (MFI1). The multiframe indicator (MFI1) is incremented every basic frame and counts from 0 to 15. For the 8 bit multiframe indicator of the second stage (MFI2), H4, bits 1-4 in frame 0 (MRI2 bits 1-4) and 1 (MFI2 bits 5-8) of the first multiframe are used. MFI2 is incremented once every multiframe of the first stage and counts from 0 to 255. The resulting overall multiframe is 4096 frames (+512 ms) long. A fuller discussion of the sequence indicator behaviour is given in ITU-T G.707.

The sequence indicator SQ identifies the sequence/order in which the individual VC-4s of the VC-4-Xv are combined to form the contiguous container. Each VC-4 is assigned a fixed unique sequence number in the range of 0 to (X-1). The 8-bit sequence number (which supports values of X up to 256) is transported in bits 1 to 4 of the H4 bytes. Thus, in addition, a sequence indicator, H4x, where x is in the range 0 to X-1 is assigned to the overhead of each virtual container, VC-4, in the present example.

Figure 5:
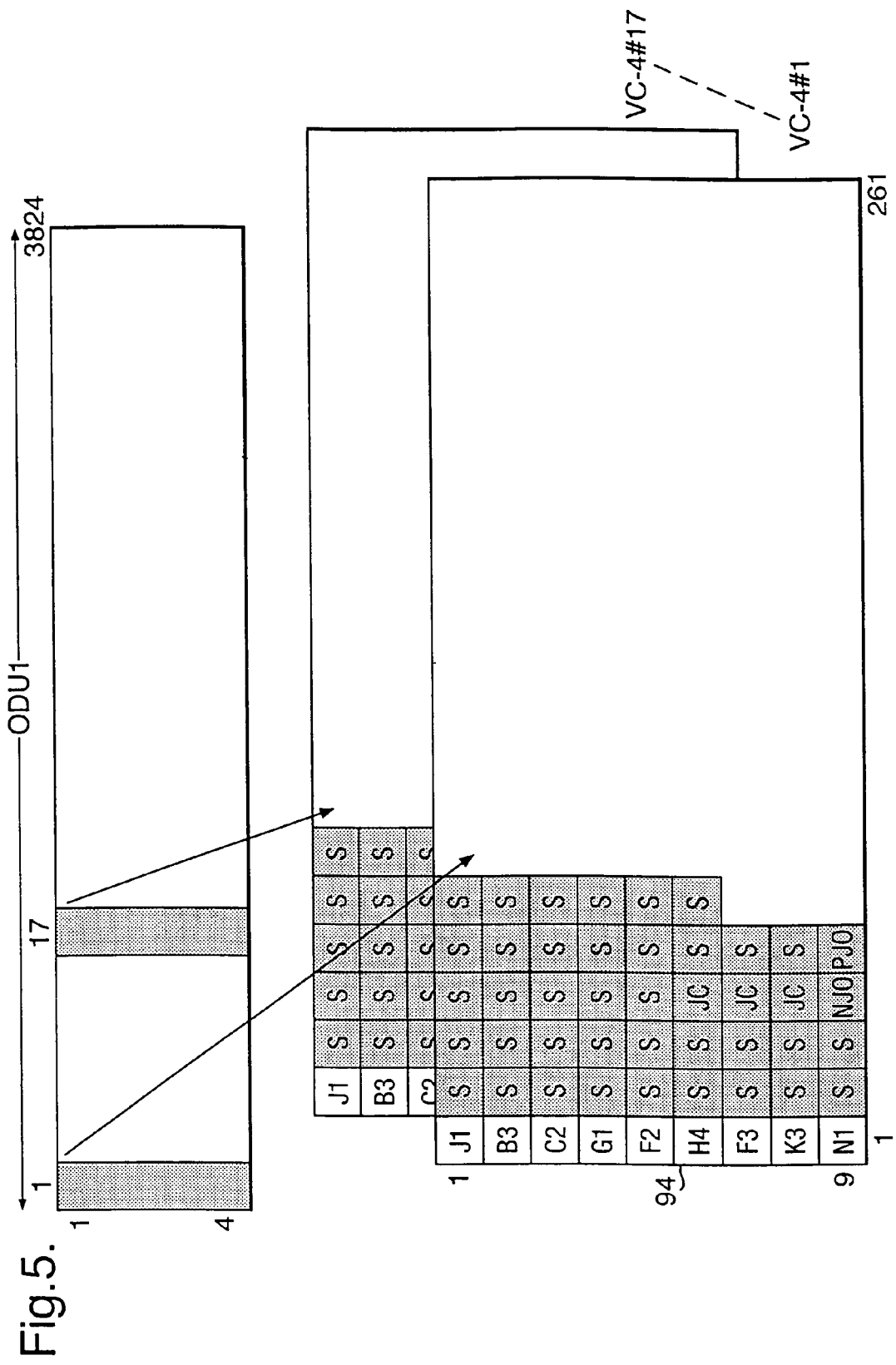
FIG. 5 shows an example of a mapping of an ODU1 into 17 VC-4s.

FIG. 5 shows an example of an optical transport network entity mapping based on the discussion given above. The figure shows how an optical data unit of order 1 (ODU1) having 4 rows and 3824 columns is mapped into 17 VC-4s, each having 9 rows and 261 columns, where the first column is reserved for the VC-4 path overhead area. As mentioned above, the sequence indicator (SQ) is transported in bits 1-4 of the H4 byte, where the indicator is zero for VC-4-1v and X-1 for VC-4-Xv.

In FIG. 5 some of the fixed stuff bytes are reallocated to other functions. One byte is taken for the negative justification opportunity (NJO). In this case a further three bytes, labelled JC, are reserved for justification control. A majority vote between the three bytes is used to invoke a justification decision in the demapping process. This protects against an error in one of the three JC signals. One possible format of these bytes is shown in table II. The skilled person will appreciate that other formats are possible.

TABLE II

Justification control byte structure. Bits 1-6 can be set to 000000 or reserved for future applications. Bits 7-8 indicate the status of the positive, PJO, and negative, NJO, justification opportunity bytes.

| JC [7, 8] | NJO | PJO |
|---|---|---|
| 00 | justification byte | data byte |
| 01 | data byte | data byte |
| 10 | Not applicable | |
| 11 | justification byte | justification byte |

Some of the other fixed stuff bytes can also be assigned to carry overhead information such as signalling channels or information from the terminated optical supervisory channel (where it is used).

One possible disadvantage of the present invention is that it is has a degree of inefficiency, approximately 6¼%. However, this is outweighed by the benefits of being able to transparently transport optical data unit of order k (ODUk) frames over an existing SDH network.

The invention cannot currently be applied to ODU3 transport, this requires more than the maximum number of 256 VC-4 allowed by present standards for virtual concatenation. However, if standards were changed, and for example bigger data formats such as an STM-1024 were developed, it is envisaged that the present invention would be applicable to larger optical transport network entities, including an ODU3 and larger. At present, however, transport of ODU3/OTU3 represents a significant challenge due to limitations of much of the world's installed fibre base. Transport over either trans-atlantic and trans-pacific submarine cables is unlikely for the foreseeable future. Inverse multiplexing of an ODU3 would require 5 rather than 4 ODU2's, due to the chosen multiplexing structure, is very inefficient, and has not been standardised. To date, it is not clear when and how much ODU3/OTU3 infrastructure will be deployed.

Figure 6:
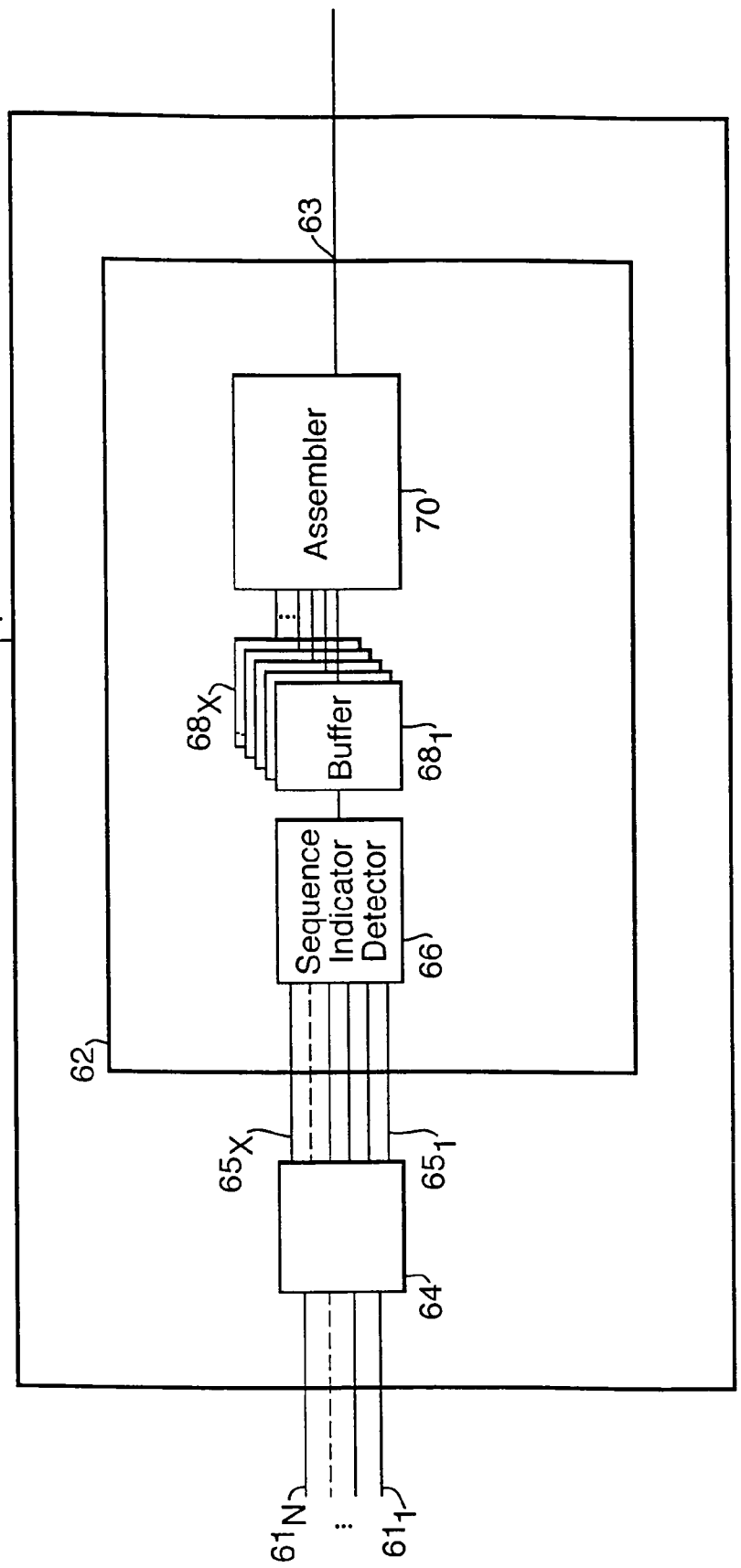
FIG. 6 shows a node according to the present invention.

FIG. 6 shows a node SNB. The node SNB corresponds to the node having the same reference numeral in FIG. 1 and is adapted to receive transmitted STM-N frames and to assemble from received STM-N frames the original optical transport network entity or other type of entity, for example, SDH or SONET entity that was input to node SNA. The node SNB includes a plurality, N, of inputs $61_1$ to $61_N$, arranged to receive a plurality, N, of STM-N frames.

The STM-N frames received at the node SNB are input to conventional STM-N termination equipment 64. At the STM-N termination equipment 64, the STM-N frame is separated out in a conventional manner into the constituent VC-4s before reaching the assembly module 62. The STM-N termination equipment 64 outputs a plurality, X, of VC-4s on a plurality, X, of outputs $65_1$ to $65_X$. The VC-4s output on outputs $65_1$ to $65_X$ are fed to an assembly module 62 which is a signal processor. The assembly module 62 assembles the original entity from VC-4s as they arrive at the SNB. The assembly module 62 includes an input for receiving VC-4s. The VC-4s are fed to a sequence indicator detector 66, which detects whether the received VC-4s include a sequence indicator. If the VC-4 received does not include a sequence indicator it is terminated at the node SNB in the conventional manner. If the VC-4 does include a sequence indicator, each VC-4 is fed to a buffer 68 which includes a plurality of storage locations $68_1$ to $68_X$ for storing each VC-4 until all virtually concatenated VC-4s which originated from the same optical data unit of order k (ODUk) are received. Once all VC-4s are stored at the buffer, the content of the buffer is fed to an assembler 70 which accesses the sequence indicators from the VC-4s received and using this sequence data assembles the original optical data unit of order k (ODUk) from the received VC-4s. At output 63, the assembly module 62 outputs the reassembled entity.

In the example given above, the assembly of an optical data unit of order k from VC-4s is described. However, the present invention is not limited in this respect, as previously discussed, other entities including but not limited to SDH or SONET entities may be assembled according to the present invention, from other data formats.

Figure 7:
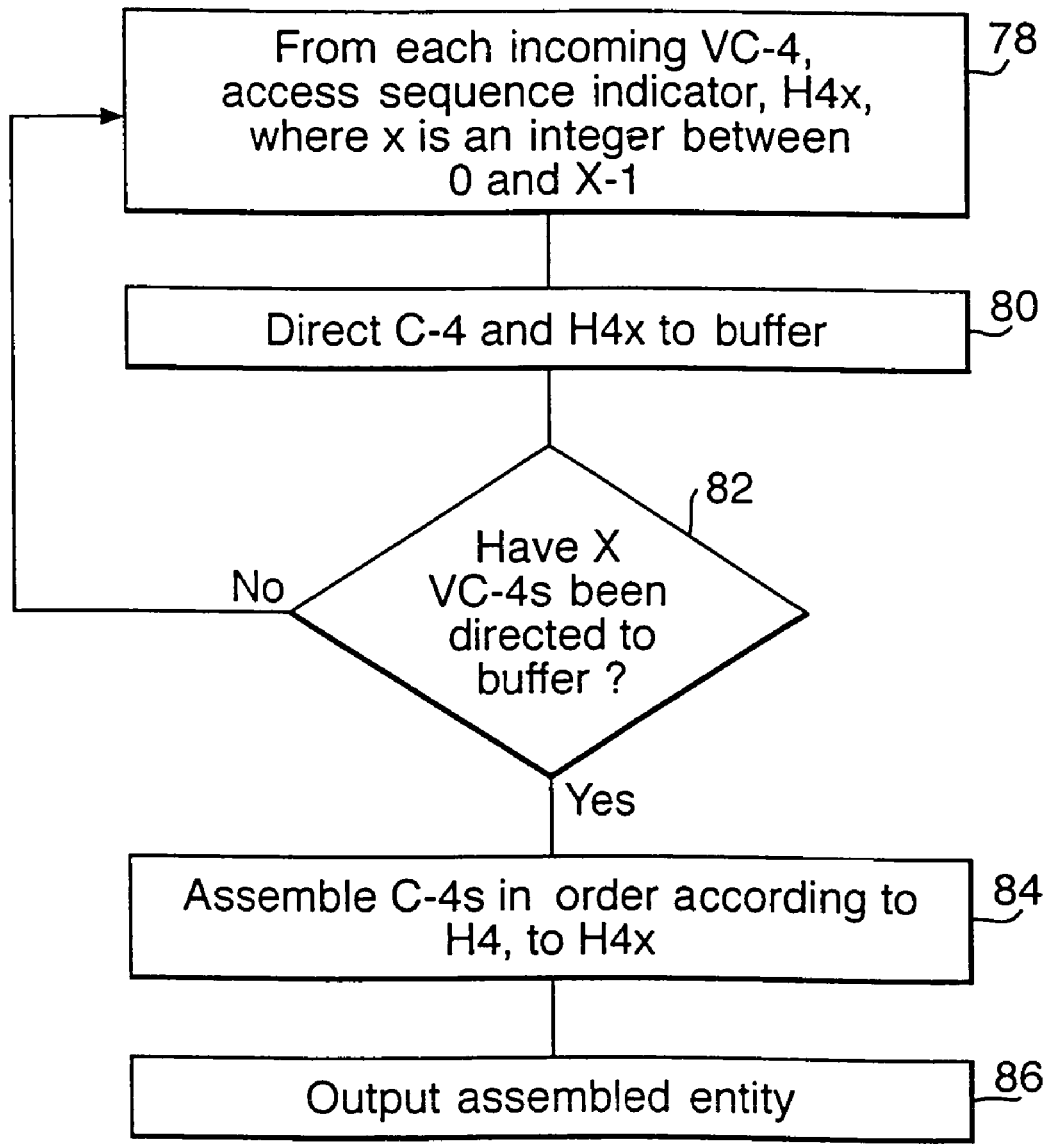
FIG. 7 shows a flow diagram illustrating the function of a node according to the present invention.

FIG. 7 shows a flow diagram illustrating the function of node SNB, as shown in FIG. 1, and as described in detail with reference to FIG. 6. In particular, FIG. 7 shows the processing steps carried out by the assembly module 62 by signal processing within the node SNB. Other components of the SNB including termination equipment 64 are conventional. The node SNB detects the incoming data format that has been transmitted across the communications link. In the example shown this data format is STM-N frames or other entities that have been mapped into VC-4s. The STM-N frames are input to the termination equipment 64 which receives the STM-N frames, terminates them, and outputs a plurality of VC-4s. The assembly module 62 detects the incoming entities. In the example shown the entities input to the assembly module 62 are VC-4s. The assembly module includes a sequence indicator detector 66 which detects 74 whether or not the incoming entity includes a sequence indicator, H4x, where x is an integer between 0 and X-1. If the entity does not include a sequence indicator the entity is terminated at the node in the conventional manner 76. If the entity includes a sequence indicator H4x, the payload area of the virtual container C-4 and the sequence indicator are directed 80 to a buffer. When X virtual containers have been directed and their payload areas and sequence indicators directed 82 to the buffer, the contents of the buffer is assembled 84 into order X=1, X=2 to X=X. In the example shown in FIG. 5 an optical data unit of order 1 (ODU1) is mapped into 17 VC-4s, so X is equal to 17. However, X will vary depending on the entity mapped at SNA, and how it is mapped and the entity into which it is mapped. Once the entity has been assembled in the order predetermined by the sequence indicators, the assembled entity is output from the assembly module 86. The output entity corresponds to the original entity that was mapped at SNA by the signal processor 22.

The embodiments described with reference to FIGS. 1-7 have particular application to optical transport networks (OTNs). As discussed previously, optical transport networks are "new" networks which are still in the process of being standardised. "Old" networks are those such as SDH and SONET networks which function according to accepted standards. Devices that allow a "new" network to be supported over an "old" network may be referred to as "modems". The embodiments disclosed are optical transport network modems because they allow an optical transport network (a "new" network) to be supported over SDH (an "old" network). Optical transport network modems may be used in a number of ways. They permit rapid introduction of optical transport network services by exploiting the existing transport infrastructure. Effectively the modem extends the optical data unit (ODU) connectivity even if the optical transport network is only provided at the edges of the network. Often when new technologies are introduced there is a lack of comprehensive operational support systems. An optical transport network modem allows existing management infrastructure to be utilised with limited development of new features.

Optical transport network modems can be deployed to connect separate optical transport network "islands". The optical transport network network is tunnelled through the intermediate SDH infrastructure that connects the "islands". This may belong to the same operator as the optical transport network "islands" or may belong to a different operator. Tunnelling allows optical transport network management information to pass through the SDH network and offers the opportunity to remotely manage an optical "island". The "islands" do not necessarily have to belong to the same operator. However, the owner of a first "island" linked to a second "island" owned by a second owner via an intermediate network owned by a third owner, would probably seek an arrangement with the second owner.

Optical transport network modems can also be used in conjunction with SDH based submarine cable systems or WDM line systems that have a large amount of spare capacity and a long life-span but are unable directly to support optical transport units. Optical transport network modems may be employed with an overlay model or with optical transport network nodes first or optical transport network line systems first. In contrast to evolution where payloads to be transported over a network are mapped over old layer networks onto the new layer network this form of evolution (new on old) allows for a simple evolutionary path. There is no need for network wide coordination when changes are made and modems can be retired as needed.

The applications for nodes supporting SDH over SDH or SONET over SONET or SDH over SONET or SONET over SDH are similar to those of optical transport network modems. That is the present invention allows an "old" network to be supported by an "old" network. The applications for SDH or SONET modems are similar to those of optical transport network modems. For example, it allows one network operator to transmit SDH management data to a remote network over a third party's intermediate network.

Figure 9:
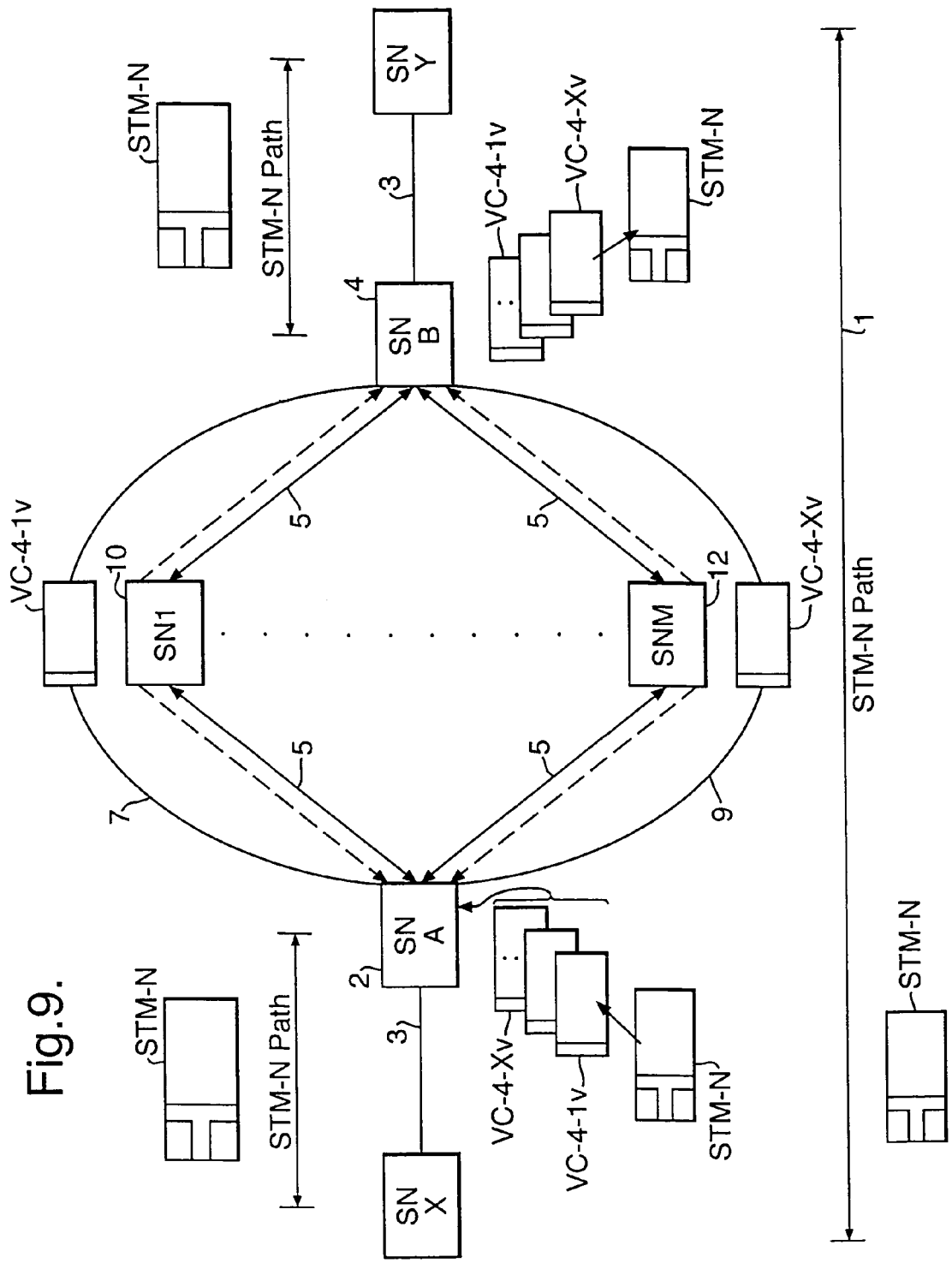
FIG. 9 shows a communications link for transmission of an SDH entity including nodes according to a the present invention.

FIG. 9 shows a communications link for transmission of an SDH entity over an SDH network including nodes SNA and SNB according to embodiments of the present invention. In FIG. 9 the SDH entity is transmitted transparently, i.e. the overhead area of the SDH entity is not accessed by the intermediate nodes SN1 to SNM. The components shown in the communications link in FIG. 9 have analogous functions to those shown in FIG. 1. The link shown in FIG. 9 includes two conventional SDH nodes, node SNX and node SNY. The figure also shows STM-N paths over which the STM-N entity is transported.

In FIG. 9, the node SNA includes a signal processor to map an incoming SDH entity, i.e. an STM-N frame, into virtual containers. The virtual containers are processed in the same manner as described with reference to FIG. 1. An overhead area is generated for each virtual container payload area. Management data for each virtual container is assigned to respective overhead areas. Further, each virtual container is assigned in its overhead area a sequence identifier. Conventionally the entity that is transported in an SDH network is the virtual container. The virtual containers will be formatted into STM-N frames prior to transportation across a communications link or network. Assigning management data and a sequence identifier to each virtual container allows each virtual container, as described with reference to FIG. 1, to be transported independently of other virtual containers across a communications link, that is the virtual containers may be virtually concatenated across the communications link. Similarly to FIG. 1, the node SNB includes an assembly module to assemble the original STM-N frame from the virtual containers received which, as in FIG. 1, are transported across intermediate nodes SN1 to SNM by virtual concatenation.

The communications link shown in FIG. 9 allows SDH management data included in the overhead areas of an STM-N frame to be tunnelled across an SDH network without that management data being altered at intermediate network nodes. In other words, it allows SDH network management data to be transported unchanged by an SDH network, and has various applications. For example, network operators may wish to sell wavelength services on wavelength division multiplex (WDM) line systems allowing semi-transparent transfer of SDH section overhead information. A WDM line system is connected to SDH equipment by means of transponders. These are devices that take optical signals from an existing SDH network and convert them into a form that the optical line system can use. For SDH, a laser that conforms to the ITU-T Recommendation G.957 specification has a broad spectral width and a loosely specified wavelength based on the 1300 or 1550 nm windows. Hence there is no guarantee that two optical signals from an SDH equipment in the 1550 nm window can be multiplexed together as nominally they are the same wavelength. In contrast in a WDM network the wavelength and spectral width are both tightly defined.

From the perspective of the SDH equipment a WDM point to point system is invisible—to each SDH optical section connection WDM system looks like a fibre. Processing of the SDH frame within the transponder is therefore severely restricted. This is generally limited to reading the content of bytes and not writing over them. This limited capability to monitor signals at the ingress and egress to WDM line systems ensures that fault management, though minimal, is possible. There are no standards describing which bytes in the SDH section overhead are processed. A common approach is to process the frame alignment words A1, A2 which use a predefined pattern, and reading JO (trace) and B1 (for errors). Other section overhead bytes are simply ignored.

Such a service is manually configured and put into operation. Flexibility can be introduced by means of an overlay allowing cross-connection of an entity that contained some of the section overhead. The limitation of this approach is that the operator has lost much of its ability to manage the service.

This can be overcome by mapping the STM-N into an optical data unit. Alternatively, as illustrated in FIG. 9, the STM-N frame can be encapsulated within SDH paths using the virtual concatenation mechanism described fully with reference to FIGS. 1 to 4, to provide a fully transparent STM-N service that can be managed. The mapping relationships are given in table III. Hence, virtual concatenation can be used to provide SDH management data over an SDH network. Prior to the present invention, this was not achievable.

TABLE III

Mapping of STM-N entities into SDH virtually concatenated VC-4's.

| SDH entity | Nominal bit rate kbit/s | Number of C-4's | Fixed stuff bytes per C-4 | Fixed stuff ratio (alpha) |
|---|---|---|---|---|
| STM-16 | 2488320 | 17 | 52 | $-0.09152 \leq \alpha \leq 0.09152$ |
| STM-64 | 9952380 | 67 | 18 | $-0.09228 \leq \alpha \leq 0.09228$ |

SDH systems are often used for transportation of synchronisation. Any system intending to transport STM-N signals must take this into account. It must be considered that optical transport networks will be used for synchronisation transport and as such the following applies equally to optical transport networks and SDH networks. The SDH frame is normally locked to a network quality clock. At the receive end of the system the same network clock can be directly extracted and re-used at the new location. Specifications for the quality of this transported clock, in terms of jitter and wander are tighter than for normal data transportation (Reference is made to G.811, G.812, G.813, and G.703. See in particular, ITU-T Recommendation G.811(1997), timing requirements at the outputs of primary reference clocks suitable for plesiochronous operation of international digital links. ITU Recommendation G.812 (1998), timing requirements at the outputs of slave clocks suitable for plesiochronous operation of international digital links. ITU Recommendation G.813 (1996), timing characteristics of SDH equipment slave clocks (SEC). ITU Recommendation G.703 (1998), physical/electrical characteristics of hierarchical digital interfaces.), which has caused problems where SDH systems have been used to transport synchronisation signals bound to plesiochronous digital hierarchy (PDH) signals within the SDH payload area. The main problem being that when an SDH equipment has to increment or decrement its pointer to the payload area the signal being presented at the output of the network will suffer a phase perturbation. The magnitude and rate of this phase movement exceeds the limits prescribed by synchronisation standards (though there is no effect upon the data integrity of the payload area).

Several techniques have been proposed for reducing the effect of pointers on the output phase of the data signal. There are however realistically only three methods for reducing the effect to the point where the payload area can be used for synchronisation transport.

1. Lower the desynchroniser bandwidth to the point that the frequency components of any remaining jitter are below the relevant requirements. This has an associated high cost in output buffer requirements and introduces some delay to the final data signal. The buffer cost has in the past precluded this. Also the quality of the timing extraction circuits (or phase locked loop oscillators) has to be improved which also increases cost.

2. Deliberately introduce pointer movements at a high frequency. The introduced signal can be modulated such that when the final desynchroniser is encountered the resultant output jitter is very low. This method is not favoured in practice and appears to remain unproven in the network environment.

3. Synchronise the bearer network to a high quality level so pointer adjustments do not occur. This is used in most operator's networks. In effect though, this only masks the problem, which can never be reduced to zero. Also failures in the synchronisation network can have an effect on the underlying data.

As outlined previously with reference to FIG. 6, the signal processor disposed in node SNB includes a buffer 68 to receive data over a period of at least 125 μs. This allows the first technique to be re-visited as the buffer is now available at effectively zero cost. The only remaining cost is in the higher timing extraction costs. However, we are now only intending to use this technique for carrying higher order payloads where this cost is much less significant than for lower order paths. It is therefore proposed that the techniques in (1) above will be able to meet requirements for synchronisation transport of the underlying STM-N or optical data unit (ODU) or optical transport unit (OTU).

Although, the examples given illustrating the present invention are directed to SDH, the invention is equally applicable to SONET. SONET transport may, for example, be based on VC-3 transport. The mapping, virtual concatenation and assembling mechanisms described according to the present invention can also be used to carry SDH frames over a SONET path based infrastructure and vice versa.

FIG. 10 shows methods of interworking between a legacy network and a new network. It will be appreciated in the discussion below, that the present invention has an important and direct consequences on how a new network, for example an optical transport network, can be introduced.

Unless a network operator constructs a new network with no legacy equipment for supporting old networks, the introduction of a new transport technology immediately creates the dilemma of how to evolve from the legacy network to the new network. This depends upon an individual network operators' choice of what types of equipment are to be introduced, in what sequence and the types of mappings used. How a new network works with the old network is known as "interworking". In considering interworking between networks it is first necessary to consider the client layer networks of both the old transport network and the new network. SDH is a mature technology that supports a wide variety of client layer mappings, as described G.707, see in particular, ITU-T Recommendation G.707 (2000), "Network node interface for the Synchronous Digital Hierarchy (SDH)" (not yet published). Below only mappings into the higher order path layers are described, in particular the VC-4. These can be broadly divided into the following categories pleisiosynchronous digital hierarchy (PDH) path layers, Lower order SDH path layers Client layer signals such as asynchronous transfer mode (ATM) virtual path and high level data link control (HDLC) framed signals such as internet protocol (IP).

For the purposes of the examples given below the last of these categories is chosen. The client layers of the optical transport network as defined in G.709 are:

2 488 320 kbit/s, 9 953 280 kbit/s or 39 813 120 kbit/s signals (with up to ±20 ppm bit rate tolerance) mapped into an optical payload unit of order k(OPUk, where k is equal to 1,2,3). These rates correspond to STM-16, STM-64 and STM-256. Mappings are provided according to two different modes, asynchronous and bit synchronous.

A constant bit rate ATM cell stream with a capacity that is identical to the optical payload unit of order k (OPUk) payload area.

Variable length Generic Frame Procedure (GFP) frames. These may be used to transport internet protocol (IP), for example.

A non-specific client mapping into an optical payload unit of order k (OPUk) is specified. Any (set of) client signal(s), after encapsulation into a continuous bit stream with a bit rate equivalent to that of the optical payload unit of order k (OPUk) payload, can be mapped.

Figure 10A:
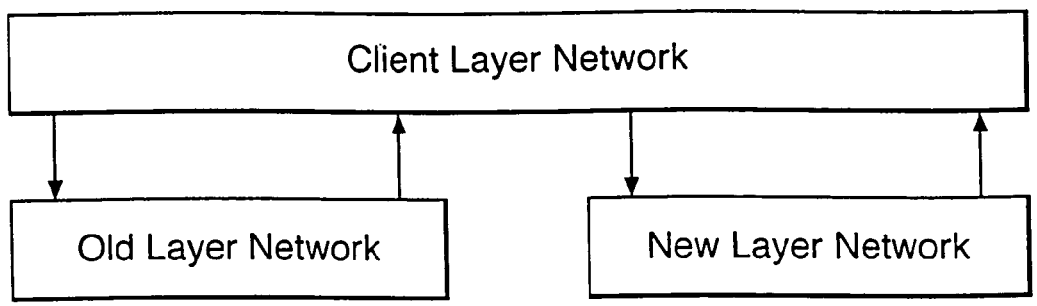
FIG. 10 shows methods of interworking between a legacy network and a new network.

Interworking between new and existing layer networks can be achieved via a client layer common to both the new and existing layer networks as shown in FIG. 10a. This form of interworking requires the termination of the respective SDH and optical transport network paths and the adaptation functions between the respective path layers and the clients. Such a combination of functions is referred to as transmultiplexing (TMUX). This requires processing at the client level when the server layers have different bit rates. Interworking in this manner is compatible with the deployment of an optical transport network overlay network where both optical transport network line systems and cross-connects (including add drop multiplexers (ADMs)) are deployed simultaneously. This is the simplest form of interworking, requiring no development of new client-server relationships. In instances where optical transport network interfaces are subsequently deployed on network elements that process client layer signals there are no interworking requirements between such network elements and the optical transport network.

Figure 10B:
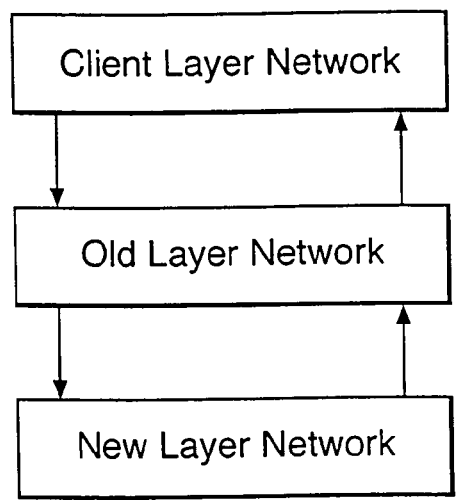

A second method of interworking is the transport of a client layer on the old layer network (SDH), over the new layer network (the optical transport network) as shown in FIG. 10b. As part of the migration from pleisiochronous digital hierarchy (PDH) to SDH, the PDH path layers were carried on SDH paths. In contrast the optical transport network transports complete SDH frames, STM-N's, rather than higher order paths. In effect the SDH section layer, which in SDH networks has static connectivity, has now become a path layer when transported over the optical transport network.

Optical transport network technology can be introduced in one of the following ways as part of a migration to a new transport network:

an overlay network as described above deployment of optical transport network line systems first, with interworking at the client level by means of transmultiplexing (TMUXing). Optical transport network cross-connects or add-drop multiplexers could subsequently be deployed to provide more widespread optical data unit/optical channel (ODU/Och) connectivity and the transmultiplexing function can be discarded. Interworking is not required between optical transport network cross-connects and line systems.

deployment of optical transport network cross-connects first, with interworking at the client level by means of transmultiplexing. This example is similar to previous example. In this example, line systems can be introduced and the transmultiplex function discarded.

deployment of optical transport network line systems first, with transport of the old layer (the STM-N) over the new layer, the optical data unit. Optical transport network nodes can then be deployed between the nodes. The major limitation of this approach is that the higher order paths and their clients are effectively inaccessible. The STM-N can be retained, but if interworking at the client layer is subsequently required then the STM-N "paths" need to be removed. This is not a simple task to implement and needs to be co-ordinated across the network.

deployment of optical transport network cross-connects first with interworking at the STM-N level. The cross-connect provides subnetwork connections for an STM-N, in other words, control of connectivity. They can be used, for example, with existing wavelength division multiplex (WDM) line systems. This evolutionary route has the same problems as the other "old on new" approach.

Figure 10C:
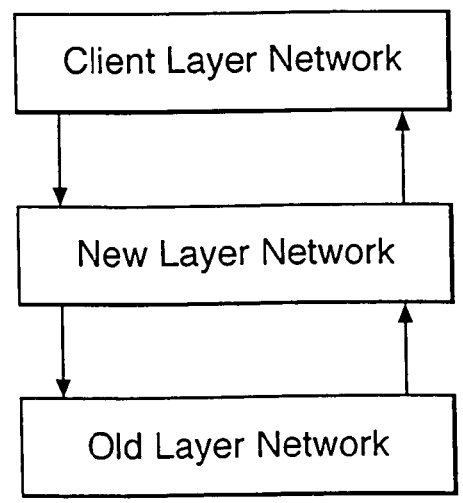
Figure 11:
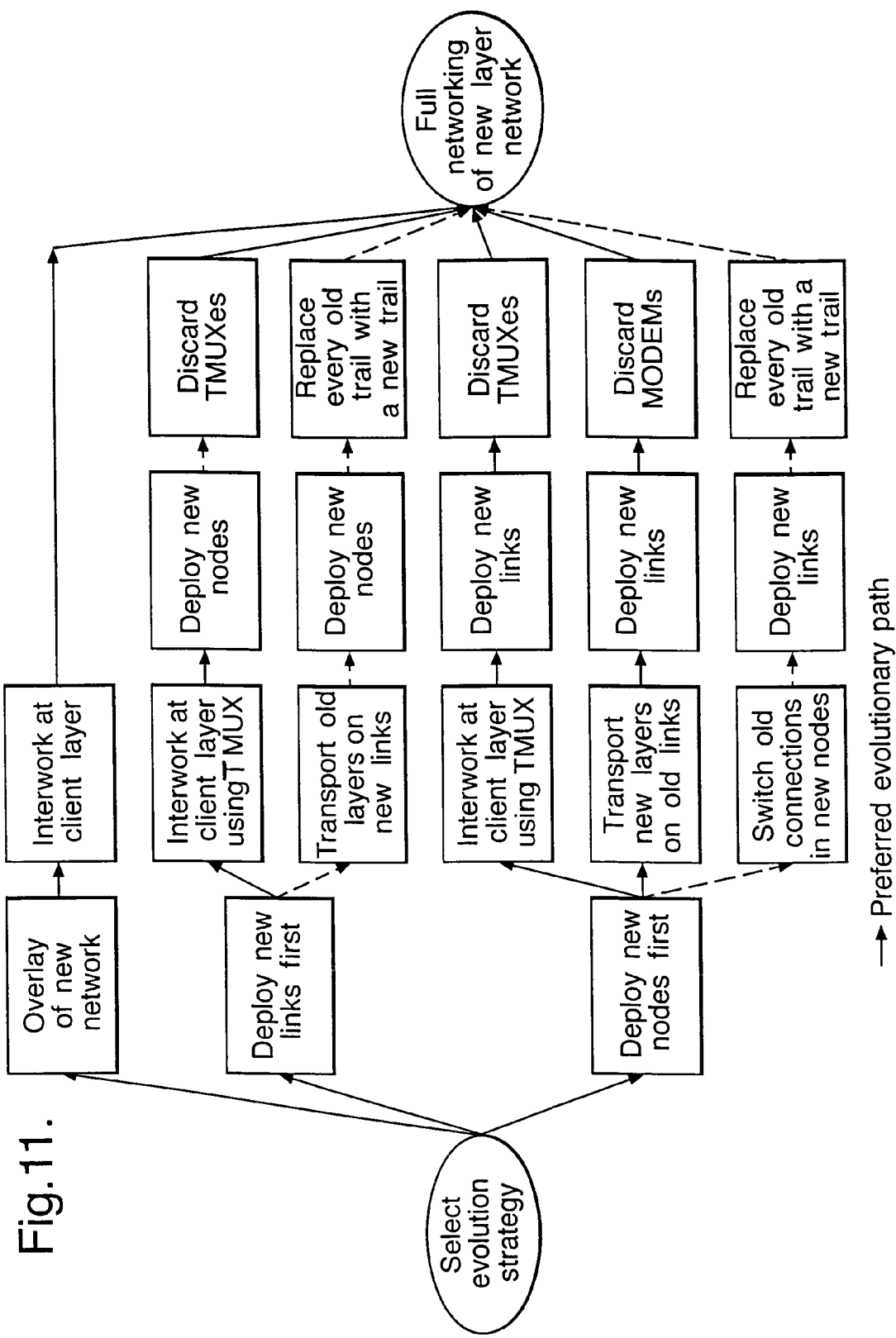
FIG. 11 shows evolution paths from a legacy network to a new network.

One further method of interworking can be envisaged. This involves transport of a new path layer technology over an old path layer technology as illustrated in FIG. 10c. This is often required as part of a transition stage during the evolution from "old" to "new". By analogy with the transition from analogue ("old") to digital ("new") networks, devices that allow a "new" network to be supported over an "old" network, as discussed above are known as modems. An example is the mapping of SDH path layer signals into PDH path layer signals, forming SDH modem functionality, as described in G.832, see in particular, ITU-T Recommendation G.832 (1998), "Transport of SDH elements on PDH networks—frame and multiplexing structures. All of the possible migration paths are illustrated in FIG. 11.

At first it may seem that such a method of interworking is not applicable between optical transport network based transport networks and SDH based transport networks. After all, an optical data unit of order 1 (ODU1) frame can support an STM-16, but, as discussed earlier, the payload area of the latter clearly cannot support an optical data unit of order 1 (ODU1). On the other hand the mapping of an optical data unit of order 1 (ODU1) into a VC-4-64c has a very poor utilisation of approximately 28%. For these reasons the transport of optical transport network entities over SDH had not previously been considered.

The present invention however has addressed this issue and provides a solution with application to both new and old networks.

The present invention provides solutions to interworking between SDH and the optical transport network and outlined evolutionary paths from one to the other. The virtual concatenation mechanism allows for the transport of optical transport network entities over SDH paths. Optical transport network modems provide a mechanism that can be used to "thicken" an optical transport network overlay to provide more widespread optical data unit connectivity using existing infrastructure. Optical transport network modems can be deployed at the edge of the network to allow rapid take-up of optical transport network services with minimum deployment of optical transport network functionality. They also have the potential to extend the life of the SDH network. They are not however restricted in their application to optical transport networks and can also be used to provide fully managed transparent STM-N transport.

What is claimed is:

1. A method of tunnelling a first frame which includes data in an overhead area and in a payload area, from a first network to a second network via an intermediate network, a first node being disposed between said first network and said intermediate network and a second node being disposed between said intermediate network and said second network, the method including:

a) at said first node, mapping said data of the first frame into the payload areas of a plurality of second frames, the second frames further including an overhead area which includes overhead data relating to the transport of the second frames over the intermediate network, assigning an identifier to each overhead area of each of said second frames, and outputting said second frames onto said intermediate network;

b) transporting said second frames across said intermediate network to said second node in accordance with said overhead data; and c) at said second node, receiving said plurality of second frames, accessing each of said identifiers, reassembling said first frame from the payload areas of said second frames using the identifiers accessed from said second frames, the reassembled first frame including the data in the overhead area and in the payload area, and outputting said reassembled first frame onto said second network;

wherein said first frames are one of optical transport network data frames and SDH or SONET data frames and said second frames are one of SDH and SONET frames.

2. A method according to claim 1, wherein step a) includes mapping said data in said overhead and said payload areas of said first frame into the payload areas of said plurality of second frames.

3. A method for mapping a first frame which includes data in an overhead area and in a payload area, from a first network towards a second network via an intermediate network, a first node being disposed between said first network and said intermediate network, said method comprising:

mapping said first frame into a plurality of second frames, by receiving a first frame of data and outputting second frames of data;

mapping said data of the first frame into payload areas of the plurality of second frames, the second frames further including an overhead area which includes overhead data relating to the transport of the second frames over the intermediate network; and assigning to each of said second frames an identifier;

wherein said second frames are SDH or SONET frames; and wherein said first frames are one of optical transport network data frames and SDH or SONET data frames;

reassembling a first frame of data from a plurality of second frames of data by receiving the plurality of second frames and outputting a first frame, accessing identifiers assigned to each of said second frames, and reassembling said first frame using said identifiers accessed from said second frames; and wherein said reassembling includes mapping data in the payload areas of said second frames into appropriate overhead and payload areas of said first frame in accordance with said identifiers.

4. A tunnelling apparatus for tunnelling a first frame which includes data in an overhead area and in a payload area, from a first network to a second network via an intermediate network, said apparatus including:

a first node having an input for receiving the first frame from the first network and an output for outputting a second frame onto an intermediate network, and a second node having an input for receiving said second frame from said intermediate network and an output for outputting a reassembled first frame onto a second network, wherein said first node further includes a mapper for mapping said data of the first frame into payload areas of a plurality of second frames, the second frames further including an overhead area which includes overhead data relating to the transport of the second frames over the intermediate network, said first node further including an assignment means for assigning an identifier to the overhead area of each of said plurality of second frames, and wherein said second node further includes accessing means for accessing said identifiers and reassembling means for reassembling said first frame from said plurality of second frames using said identifiers;

wherein said second frames are SDH or SONET frames; and wherein said first frames are one of optical transport network data frames and SDH or SONET data frames.

5. An apparatus according to claim 4, wherein said mapper maps said data in said overhead and said payload areas of said first frame into the payload areas of said plurality of second frames.

6. An apparatus according to claim 4, wherein said means for reassembling includes a mapper for mapping the data in said payload areas of said second frames into appropriate overhead and payload areas of said first frame.

7. A method of tunneling a first frame which includes data in an overhead area and in a payload area, from a first network to a second network via an intermediate network, the method comprising:

mapping said data of the first frame into the payload areas of a plurality of second frames, the second frames further including an overhead area which includes overhead data relating to the transport of the second frames over the intermediate network, assigning an identifier to each overhead area of each of said second frames, and outputting said second frames onto said intermediate network;

transporting said second frames across said intermediate network in accordance with said overhead data; and receiving said plurality of second frames, accessing each of said identifiers, reassembling said first frame from the payload areas of said second frames using the identifiers accessed from said second frames, the re-assembled first frame including the data in the overhead area and in the payload area, and outputting said reassembled first frame onto said second network;

wherein said second frames are SDH or SONET frames; and wherein said first frames are one of optical transport network data frames and SDH or SONET data frames.

* * * * *